US007203455B2

(12) United States Patent
Ernst et al.

(10) Patent No.: US 7,203,455 B2
(45) Date of Patent: Apr. 10, 2007

(54) INTERACTIVE MULTI-SENSORY READING SYSTEM ELECTRONIC TEACHING/LEARNING DEVICE

(75) Inventors: Stephen M. Ernst, Colorado Springs, CO (US); John W. Taylor, Elma, NY (US); Dagan Galarneau, Sacramento, CA (US); Joseph E. Hoppy, East Aurora, NY (US); James A. Bishop, Jr., North Tonawanda, NY (US); Philip R. Pyrce, Getzville, NY (US); James P. Meade, Hamburg, NY (US)

(73) Assignee: Mattel, Inc., El Segundo, CA (US)

( * ) Notice: Subject to any disclaimer, the term of this patent is extended or adjusted under 35 U.S.C. 154(b) by 217 days.

(21) Appl. No.: 10/448,582

(22) Filed: May 30, 2003

(65) Prior Publication Data

US 2004/0043371 A1 Mar. 4, 2004

Related U.S. Application Data

(60) Provisional application No. 60/385,159, filed on May 30, 2002.

(51) Int. Cl.
*G09B 5/00* (2006.01)
(52) U.S. Cl. .................. 434/317; 434/169; 434/362; 345/173
(58) Field of Classification Search ............ 434/169, 434/201, 307 R, 308, 317, 362, 365; 345/173–179; 341/33; 340/365; 178/19, 18.06
See application file for complete search history.

(56) References Cited

U.S. PATENT DOCUMENTS

| 3,086,297 A | 4/1963 | Kay |
|---|---|---|
| 3,172,215 A | 3/1965 | Ragen |
| 3,529,832 A | 9/1970 | Goetz et al. |
| 3,553,851 A | 1/1971 | Paige |
| 3,605,285 A | 9/1971 | BenDaniel et al. |
| 3,738,021 A | 6/1973 | Hino |
| 3,795,989 A | 3/1974 | Greenberg et al. |
| 3,798,370 A | 3/1974 | Hurst |
| 3,823,814 A | 7/1974 | Lum |
| 3,866,751 A | 2/1975 | Holert |
| 3,911,215 A | 10/1975 | Hurst et al. |
| 4,220,815 A | 9/1980 | Gibson et al. |
| 4,355,984 A | 10/1982 | Slavik et al. |
| 4,357,489 A | 11/1982 | Henderson et al. |
| 4,380,007 A | 4/1983 | Steinegger |

(Continued)

OTHER PUBLICATIONS

International Search Authority; PCT International Search Report; Aug. 26, 2003.

*Primary Examiner*—Jor H. Cheng
(74) *Attorney, Agent, or Firm*—Akin Gump Strauss Hauer & Feld, LLP

(57) ABSTRACT

An electronic learning/teaching device operates with and without a printed sheet element having an arrangement of selectable content by means of a user responsive sensor array beneath a surface configured to receive the element. The sensor array is formed by cross-points of two sets of crossing conductive lines, one set being driven sequentially with a radio frequency square wave and the other set being sampled sequentially though a high impedance amplifier connection with an asynchronous detection circuit. Where more than one cross-point location is user activated, algorithms are used to identify one cross-point sensor location as the user activated selection.

7 Claims, 20 Drawing Sheets

U.S. PATENT DOCUMENTS

| | | |
|---|---|---|
| 4,395,058 A | 7/1983 | Terrell |
| 4,403,965 A | 9/1983 | Hawkins |
| 4,406,626 A | 9/1983 | Anderson et al. |
| 4,411,628 A | 10/1983 | Laughon et al. |
| 4,418,278 A | 11/1983 | Mondshein |
| 4,425,099 A | 1/1984 | Naden |
| 4,430,015 A | 2/1984 | Nerlinger |
| 4,514,817 A | 4/1985 | Pepper et al. |
| 4,516,260 A | 5/1985 | Breedlove et al. |
| 4,550,310 A | 10/1985 | Yamaguchi et al. |
| 4,556,871 A | 12/1985 | Yoshikawa et al. |
| 4,561,002 A | 12/1985 | Chiu |
| 4,567,470 A | 1/1986 | Yoshikawa et al. |
| 4,571,454 A | 2/1986 | Tamaru et al. |
| 4,631,748 A | 12/1986 | Breedlove et al. |
| 4,636,881 A | 1/1987 | Brefka et al. |
| 4,686,332 A | 8/1987 | Greanias et al. |
| 4,703,573 A | 11/1987 | Montgomery et al. |
| 4,710,877 A | 12/1987 | Ahmed |
| 4,723,056 A | 2/1988 | Tamaru et al. |
| 4,749,353 A | 6/1988 | Breedlove |
| 4,752,230 A | 6/1988 | Shimizu |
| 4,766,368 A | 8/1988 | Cox |
| 4,778,391 A | 10/1988 | Weiner |
| 4,809,246 A | 2/1989 | Jeng |
| 4,818,827 A | 4/1989 | Ipcinski et al. |
| 4,820,233 A | 4/1989 | Weiner |
| 4,853,498 A | 8/1989 | Meadows et al. |
| 4,853,499 A | 8/1989 | Watson |
| 4,884,974 A | 12/1989 | DeSmet |
| 4,890,096 A | 12/1989 | Taguchi et al. |
| 4,913,463 A | 4/1990 | Tlapek et al. |
| 4,970,659 A | 11/1990 | Breedlove et al. |
| 4,990,092 A | 2/1991 | Cummings |
| 4,997,374 A | 3/1991 | Simone |
| 5,007,085 A | 4/1991 | Greanias et al. |
| 5,010,495 A | 4/1991 | Willetts |
| 5,022,522 A | 6/1991 | Kennedy |
| 5,088,928 A | 2/1992 | Chan |
| 5,113,178 A | 5/1992 | Yasuda et al. |
| 5,129,654 A | 7/1992 | Bogner |
| 5,166,679 A | 11/1992 | Vranish et al. |
| 5,167,508 A | 12/1992 | McTaggart |
| 5,174,759 A | 12/1992 | Preston |
| 5,188,533 A | 2/1993 | Wood |
| 5,203,705 A | 4/1993 | Hardy et al. |
| 5,209,665 A | 5/1993 | Billings et al. |
| 5,220,136 A | 6/1993 | Kent |
| 5,226,822 A | 7/1993 | Morris |
| 5,257,431 A | 11/1993 | Larson et al. |
| 5,263,865 A | 11/1993 | Zipf |
| 5,290,190 A | 3/1994 | McClanahan |
| 5,302,132 A | 4/1994 | Corder |
| 5,305,017 A | 4/1994 | Gerpheide |
| 5,356,296 A | 10/1994 | Pierce et al. |
| 5,363,051 A | 11/1994 | Jenstrom et al. |
| 5,364,272 A | 11/1994 | Herman et al. |
| 5,365,434 A | 11/1994 | Figliuzzi |
| 5,374,195 A | 12/1994 | McClanahan |
| 5,374,787 A | 12/1994 | Miller et al. |
| 5,397,890 A | 3/1995 | Schueler et al. |
| 5,402,151 A * | 3/1995 | Duwaer ................ 345/173 |
| 5,404,444 A | 4/1995 | Billings |
| 5,413,355 A | 5/1995 | Gonzalez |
| 5,413,486 A | 5/1995 | Burrows et al. |
| 5,417,575 A | 5/1995 | McTaggart |
| 5,418,551 A | 5/1995 | Ise |
| 5,419,705 A | 5/1995 | Sandvik |
| 5,429,513 A | 7/1995 | Diaz-Plaza |
| 5,433,614 A | 7/1995 | Beye |
| 5,437,552 A | 8/1995 | Baer et al. |
| 5,463,388 A | 10/1995 | Boie et al. |
| 5,466,158 A | 11/1995 | Smith, III |
| 5,474,457 A | 12/1995 | Bromley |
| 5,484,292 A | 1/1996 | McTaggart |
| 5,485,176 A | 1/1996 | Ohara et al. |
| 5,508,700 A | 4/1996 | Taylor et al. |
| 5,511,980 A | 4/1996 | Wood |
| 5,517,407 A | 5/1996 | Weiner |
| 5,538,430 A | 7/1996 | Smith et al. |
| 5,539,292 A | 7/1996 | Vranish |
| 5,565,658 A | 10/1996 | Gerpheide et al. |
| 5,569,868 A | 10/1996 | Leung |
| 5,572,769 A | 11/1996 | Spechts et al. |
| 5,575,659 A | 11/1996 | King et al. |
| 5,604,517 A | 2/1997 | Filo |
| 5,631,883 A | 5/1997 | Li |
| 5,636,995 A | 6/1997 | Sharpe, III et al. |
| 5,645,432 A | 7/1997 | Jessop |
| 5,648,642 A | 7/1997 | Miller et al. |
| 5,650,597 A | 7/1997 | Redmayne |
| 5,651,044 A | 7/1997 | Klotz, Jr. et al. |
| 5,686,705 A | 11/1997 | Conroy et al. |
| 5,697,793 A | 12/1997 | Huffman et al. |
| 5,707,240 A | 1/1998 | Haas et al. |
| 5,717,938 A | 2/1998 | Garthwaite et al. |
| 5,722,686 A | 3/1998 | Blackburn et al. |
| 5,739,814 A | 4/1998 | Ohara et al. |
| 5,749,735 A | 5/1998 | Redford et al. |
| 5,774,109 A | 6/1998 | Winksy et al. |
| 5,795,213 A | 8/1998 | Goodwin |
| 5,799,267 A | 8/1998 | Siegel |
| 5,801,340 A | 9/1998 | Peter |
| 5,810,599 A | 9/1998 | Bishop |
| 5,810,604 A | 9/1998 | Kopp, Jr. et al. |
| 5,813,861 A | 9/1998 | Wood |
| 5,823,782 A | 10/1998 | Marcus et al. |
| 5,825,352 A | 10/1998 | Bisset et al. |
| 5,829,985 A | 11/1998 | Campanella |
| 5,831,600 A * | 11/1998 | Inoue et al. ................ 345/173 |
| 5,836,771 A | 11/1998 | Ho et al. |
| 5,839,902 A | 11/1998 | Wood |
| 5,841,078 A | 11/1998 | Miller et al. |
| 5,861,583 A | 1/1999 | Schediwy et al. |
| 5,865,677 A | 2/1999 | Goldfarb et al. |
| 5,877,458 A | 3/1999 | Flowers |
| 5,881,434 A | 3/1999 | Rigney |
| 5,889,236 A | 3/1999 | Gillespie et al. |
| 5,893,132 A | 4/1999 | Huffman et al. |
| 5,897,324 A | 4/1999 | Tan |
| 5,902,112 A | 5/1999 | Mangold |
| 5,902,116 A | 5/1999 | Rieber et al. |
| 5,910,009 A | 6/1999 | Leff et al. |
| 5,914,465 A | 6/1999 | Allen et al. |
| 5,914,706 A | 6/1999 | Kono |
| 5,920,309 A | 7/1999 | Bisset et al. |
| 5,932,863 A | 8/1999 | Rathus et al. |
| 5,933,288 A | 8/1999 | Plesko |
| 5,944,533 A | 8/1999 | Wood |
| 5,944,574 A | 8/1999 | Small et al. |
| 5,946,083 A | 8/1999 | Melendez et al. |
| 5,951,298 A | 9/1999 | Werzberger |
| 5,954,514 A | 9/1999 | Haas et al. |
| 5,954,515 A | 9/1999 | Iggulden |
| 5,957,697 A | 9/1999 | Iggulden et al. |
| 5,973,318 A | 10/1999 | Plesko |
| 5,990,804 A * | 11/1999 | Koyama ................ 340/5.82 |
| 5,997,304 A | 12/1999 | Wood |
| 6,009,397 A | 12/1999 | Siegel |
| 6,010,405 A | 1/2000 | Morawiec |
| 6,017,219 A | 1/2000 | Adams, Jr. et al. |
| 6,041,215 A | 3/2000 | Maddrell et al. |
| 6,053,741 A | 4/2000 | Wood |
| 6,064,855 A | 5/2000 | Ho |

| | | | | | | |
|---|---|---|---|---|---|---|
| 6,067,026 | A | 5/2000 | Weimer et al. | 6,661,405 B1 | 12/2003 | Flowers |
| 6,072,980 | A | 6/2000 | Manico et al. | 6,668,156 B2 | 12/2003 | Lynch et al. |
| 6,077,085 | A | 6/2000 | Parry et al. | D487,118 S | 2/2004 | Elias |
| 6,079,748 | A | 6/2000 | Kaufman | D489,367 S | 5/2004 | Lynch et al. |
| 6,089,943 | A | 7/2000 | Lo | 6,750,978 B1 | 6/2004 | Marggraff et al. |
| 6,094,610 | A | 7/2000 | Steffens, Jr. et al. | D492,679 S | 7/2004 | Avery |
| 6,101,367 | A | 8/2000 | Luciano | D492,680 S | 7/2004 | Avery |
| 6,120,297 | A | 9/2000 | Morse, III et al. | D493,495 S | 7/2004 | Avery |
| 6,124,851 | A | 9/2000 | Jacobson | D493,787 S | 8/2004 | Avery |
| 6,134,529 | A | 10/2000 | Rothenberg | 6,954,199 B2 * | 10/2005 | Soto et al. .......... 345/173 |
| 6,142,784 | A | 11/2000 | Wood | 2001/0051329 A1 | 12/2001 | Lynch et al. |
| 6,148,173 | A | 11/2000 | Bell | 2002/0030638 A1 | 3/2002 | Weiner |
| 6,154,214 | A | 11/2000 | Uyehara et al. | 2002/0054372 A1 | 5/2002 | Takahashi |
| 6,190,174 | B1 | 2/2001 | Lam | 2002/0076683 A1 | 6/2002 | Chen |
| 6,201,947 | B1 | 3/2001 | Hur et al. | 2002/0081560 A1 | 6/2002 | Ka-wah et al. |
| 6,222,528 | B1 | 4/2001 | Gerpheide et al. | 2002/0090596 A1 | 7/2002 | Sosoka et al. |
| 6,239,389 | B1 | 5/2001 | Allen et al. | 2002/0197589 A1 | 12/2002 | Wood et al. |
| 6,262,717 | B1 | 7/2001 | Donohue et al. | 2003/0016210 A1 | 1/2003 | Soto et al. |
| 6,269,238 | B1 | 7/2001 | Iggulden | 2003/0059757 A1 | 3/2003 | Wood |
| 6,327,459 | B2 | 12/2001 | Redford et al. | 2003/0077558 A1 | 4/2003 | Wood et al. |
| 6,330,427 | B1 | 12/2001 | Tabachnik | 2003/0116620 A1 | 6/2003 | Song |
| 6,343,935 | B1 | 2/2002 | Clements | 2003/0129572 A1 | 7/2003 | Shuler et al. |
| 6,356,287 | B1 | 3/2002 | Ruberry et al. | 2003/0129576 A1 | 7/2003 | Wood et al. |
| 6,364,666 | B1 | 4/2002 | Jenkins et al. | 2003/0139113 A1 | 7/2003 | Wood et al. |
| 6,405,167 | B1 | 6/2002 | Cogliano | 2003/0162162 A1 | 8/2003 | Marggraff |
| 6,416,326 | B1 | 7/2002 | Oh | 2003/0175672 A1 | 9/2003 | Kim et al. |
| 6,434,518 | B1 | 8/2002 | Glenn | 2003/0218604 A1 | 11/2003 | Wood et al. |
| 6,463,257 | B1 | 10/2002 | Wood | 2004/0032369 A1 | 2/2004 | Flowers |
| 6,491,220 | B1 | 12/2002 | May | 2004/0104890 A1 | 6/2004 | Caldwell et al. |
| 6,512,497 | B1 | 1/2003 | Kondo et al. | 2004/0219501 A1 * | 11/2004 | Small et al. .......... 434/317 |
| 6,608,618 | B2 | 8/2003 | Wood et al. | | | |
| 6,641,401 | B2 | 11/2003 | Wood et al. | * cited by examiner | | |

INTERACTIVE MULTI-SENSORY READING SYSTEM ELECTRONIC TEACHING/LEARNING DEVICE

CROSS-REFERENCE TO RELATED APPLICATIONS

This application is related to U.S. Provisional Patent Application No. 60/385,159 filed May 30, 2002 and entitled "Interactive Book Reading Device . . . (etc,)", and claims the earlier filing date of the related application.

BACKGROUND OF THE INVENTION

The present invention relates generally to electronic teaching/learning devices for an interactive multi-sensory teaching/learning system. More particularly, the present invention relates to electronic teaching/learning devices that allow a child or other student to activate electronic speech and sound by selecting words or images on the device or at least on pages of multi-page books or other printed sheet elements removably insertable into a recessed area of the device.

Interactive electronic early-learning devices are well known and have been employed for many years as teaching aids and entertainment devices. Many of the first "reader" devices developed used individual cards with words and/or graphics printed on each card. These readers used microcontrollers with software that map the contents of each card individually. The words or graphics printed on the card were associated with stored sounds and sound effects located in memory. Selection of a word or graphic printed on the card by the user would generate the associated audio sound from the reader. The typical association would be for the reader to audibly pronounce the selected word or letter printed on the card.

Most of the first early-learning card reading devices employed a panel array of membrane switches. These were formed by a flexible membrane sheet with printed electrical contacts overlying a substrate with separate electrical contacts and some type of thin, open separator to keep the membrane of the substrate separate until points on the membrane were depressed. The membrane switches were arranged to match the content on the cards. The cards were placed on the reader and a method of card identification was employed so that the reader knew which card was on the reading device. The card identification methods varied from optical card sensing through manual input. A common method of card or page identification is to select the card or page placed on the reader by pressing on a spot located on the card that is unique to that card. Selection of a word, letter or graphic printed on the card was accomplished by forcibly pressing down on the selected word, letter or graphic to close the contacts of the membrane switch located under the card. The microprocessor would then produce the associated audio through an audible output device (e.g., speaker) in the housing of the book-reading device. Many devices have been developed that use this basic technique of printed word, letter or graphic association with stored audio sound files.

In some cases individual cards were used separately or bound together to make small books that were placed on the reading device. For use with a membrane switch device, the printed cards or book pages need to be very thin and flexible in order to allow the force of pressing on the card or book page to be transferred to the membrane switches located under the book.

In order to overcome this drawback, new reading devices were developed that used a handheld electronic stylus pointing pen that injected an electronic signal into a receiving sensor array located under the book. These allowed use of the thicker books with thicker pages. However, a drawback to the pen devices is that the user, typically very young children, must be trained to use the pen whereas the finger selection method used by the membrane switch designs is more intuitive for the target audience.

It is believed that a user friendly device designed for an easy to use electronic reader device, and more particularly for accurate finger-based content selection, will significantly increase the value of conventional electronic reading aids and, through fun and engaging play, more enjoyably assist a child or student in developing literacy skills.

BRIEF SUMMARY OF THE INVENTION

In one aspect, the invention is a method of operating an interactive electronic teaching/learning device configured to receive a printed sheet product having a predetermined orientation on the device and a selectable content, the device comprising a housing including a platform configured to receive the printed sheet product when the printed sheet product in the predetermined orientation; an electronic user interface in the housing including a user-responsive position sensor having an active range above the platform and including a plurality of individual sensors arranged in an array in the platform; and control electronics in the housing including a memory having therein instructions associated with the selectable content of the printed sheet product and a controller in electrical communication with the electronic user interface, the controller being configured to perform at least the steps of operating in accordance with the instructions in the memory, determining a selected position within the active range of the position sensor, recognizing a selection of the selectable content by the selector, and sending to the electronic user interface a signal associated with the selection; a method of operating the device wherein the determining step comprises the steps of: identifying a plurality of possible user-selected sensor positions; and selecting only one of the plurality of possible user-selected sensor positions as the selection.

In another aspect, the invention is an interactive, electronic teaching/learning device having a platform with a first, generally planar, user contact surface overlying a first, generally planar sensor, the first sensor including a plurality of at least touch-responsive, mutually adjoining sensors organized in a two-dimensional array, the array being formed by separate and separated first and second sets of generally parallel, individual conductive lines transversely crossing over each other beneath an upper surface of the platform, characterized by: a radio frequency oscillating signal generator cyclically coupled to individual conductive lines the first set; and a synchronous detection circuit operatively coupled with the generator and with individual conductive lines of the second set to identify user actuated individual cross-points of the first and second sets of lines of the array.

BRIEF DESCRIPTION OF THE SEVERAL VIEWS OF THE DRAWINGS

The foregoing summary, as well as the following detailed description of preferred embodiments of the invention, will be better understood when read in conjunction with the appended drawings. For the purpose of illustrating the In the drawings.

DETAILED DESCRIPTION OF THE INVENTION

An electronic teaching/learning system includes an toy, electronic, interactive, teaching/learning device, software and one or more books or other removable printed planar elements such as individual sheets, cards, stencils, etc. The software may be stored in one or more auxiliary processing cartridges which accompany the printed element(s), or in a memory within the device 100 or both. When provided together, the cartridge and printed element are a matched pair and are used in the device simultaneously.

Figure 1:
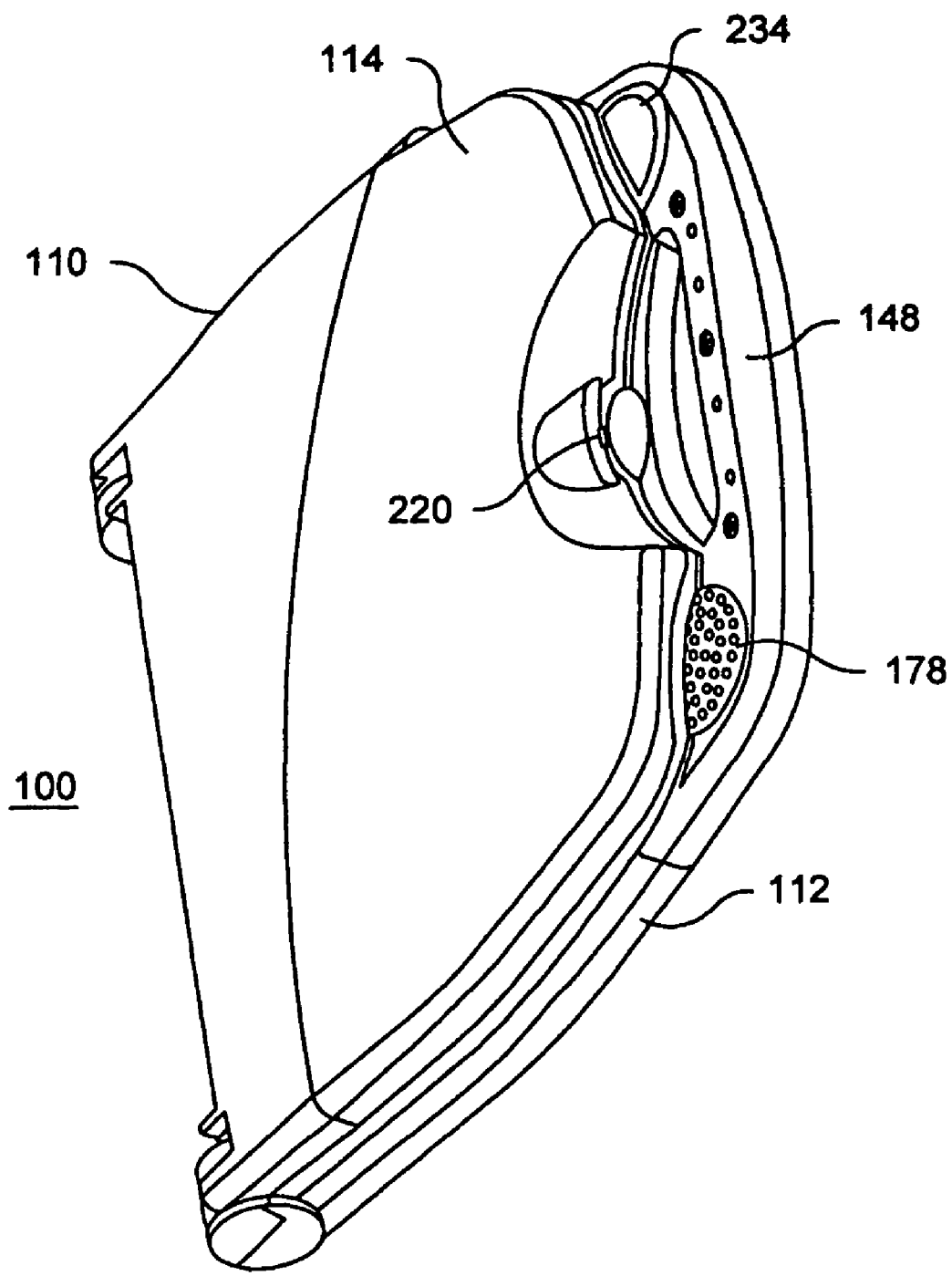
FIG. 1 is a top perspective view of a preferred embodiment of present invention showing an electronic teaching/learning device in the closed position.
Figure 2:
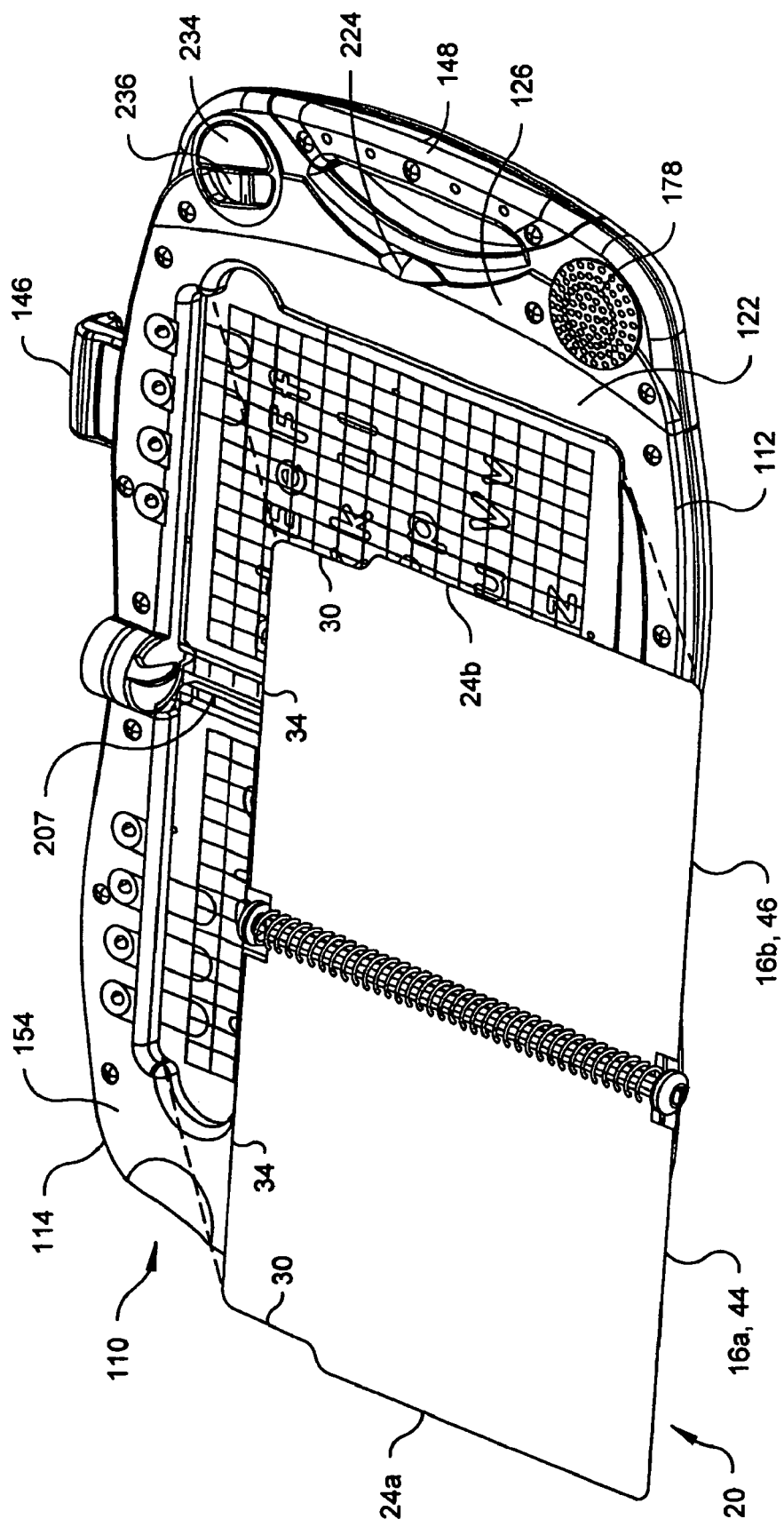
FIG. 2 is a top perspective view of the device in FIG. 1 partially overlaid with a book open to a two-page spread.
Figure 3:
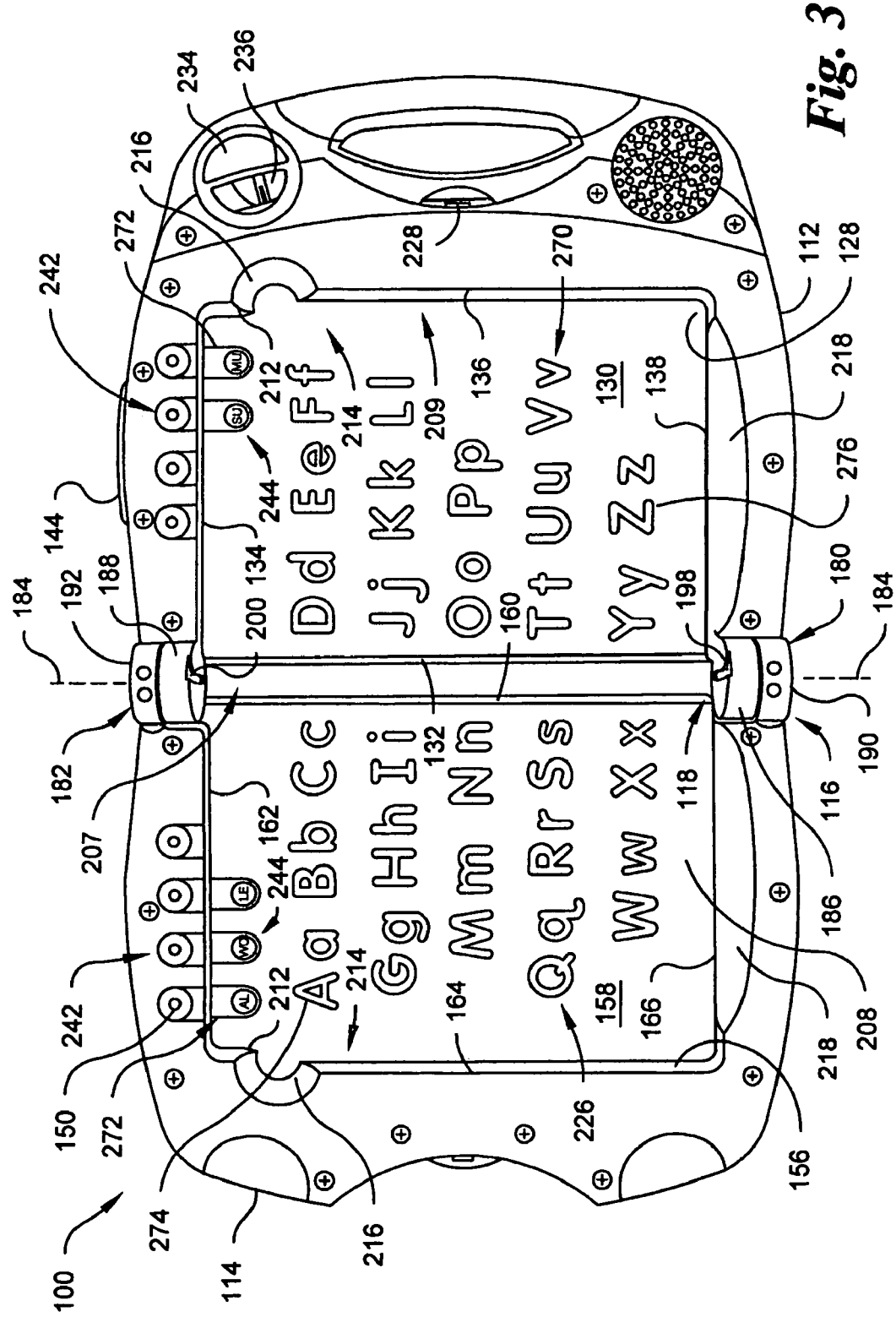
FIG. 3 is a top plan view of the device of FIGS. 1–2 in the open position without a book.

Referring to FIGS. 1–3, there is shown a currently preferred embodiment of a toy interactive, electronic teaching/learning device, generally designated 100 in accordance with the present invention. The electronic learning device 100 is configured for stand alone use as well as for receiving a book 10 or other removable printed planar element(s).

The device 100 may be configured, in particular, as an interactive book reader that has a sensor that can sense the location of a finger when it is placed on a book 10 within an active finger sensor area of the device 100. The active sensor area is preferably matched to the size of the book(s) or other printed sheet element(s) that might be placed on the device 100. The preferred sensor of the device 100 can sense the presence of a finger at a distance of at least about ¼" from the planar surface of the sensor. This z (height) resolution will allow the sensor to detect the presence of a finger through a book that is up to at least ¼" thick. The sensor preferably has an x and y resolution in planes parallel to the plane of the sensor that is fine enough to select every word or other graphic indicia or icon that is printed on the book 10. The resolution is based on the number of cross-points of the sensor, and how they correspond positionally to the words and graphics on the surface over the sensor or printed on the book or on another removable planar element such as a printed sheet or stencil that might be used with device 100.

The software within an auxiliary processing cartridge 146 or within the device 100 itself contains information to produce sound effects (including music and speech) or actions associated with graphics and printed words within the book or other printed removable element or with respect to letters, words or other graphics printed on the upper surface of the sensor. The x and y coordinates of words or graphics and their corresponding sound effects or actions, are mapped into a memory located in the auxiliary processing cartridge 146 or in the device 100 itself. Selecting any text or graphic by simply touching it will produce at least an audio output associated with the specifically selected text or graphic. This information preferably is organized in a page-by-page architecture. The user of the device 100 either interacts with the sensor directly using any graphics that may be printed on its surface or places a book 10 or other printed sheet on the sensor surface and inserts the auxiliary processing cartridge 146 (if required) for that book into an auxiliary slot 144 of the device 100 and interacts through the printed object 10 and the sensor. The device 100 can then produce an appropriate audio output in response to a finger touch on any word or graphic. This open architecture allows for infinite books and software to be used on the generic device 100.

The device 100 is also the subject of co-pending U.S. Patent applications filed by the assignee of the present application. The co-pending applications are No. 60/385,259 filed May 31, 2002 and Ser. No. 10/488,583, filed May 30, 2003. Both are incorporated herein by reference. Accordingly, only the features of the overall device 100 pertinent to an understanding of present invention are briefly summarized in this disclosure.

Referring to FIGS. 1–3, the device 100 has a housing assembly or simply "housing" 110 configured in particular to receive the book 10 when the book is in the predetermined orientation with upper, lower, left and right sides proximal to upper, lower, left and right sides of the device 100. The housing 110 comprises two generally planar platforms, a base 112 and a cover 114 joined by hinges 180, 182, as well as a book mounting assembly 118, latch 220 and a hand grip 148. The first platform, the base 112, has a first base recess 128 with a first, planar recessed surface 130. The base recess 128 is bounded by a recessed edge 132 and first, second and third recess border sidewalls 134, 136, 138. Below surface 130 is user-responsive position sensor in the form of a matrix of separate but crossing conductive lines constituting a first cross point sensor array 142 discussed below. A cartridge slot 144 may be provided at the top of the base 112 for receiving a removable ROM cartridge 146 as will be discussed for use with book 10 or other removable printed planar element (e.g. sheet or card or template) used with the device. The second platform, the cover 114, has a second, cover recess 156 with a second, planar recessed surface 158. The cover recess 156 is bounded by a recessed edge 160 and first, second and third border recess sidewalls 162, 164, 166. Beneath the second cover contact surface 158 is a second sensor in the form of a matrix of separate but crossing conductive lines constituting a second cross point sensor array 170 discussed below. A speaker retainer 176 supports a speaker 178. Hinges 180 and 182 are hollow and configured to provide a passageway (not depicted) through each hinge for electrical conductors (not shown) connecting electronics in the base 112 to electronics in the cover 114.

Referring to FIG. 2, a preferred book 10 has a plurality of pages 16 connected by a binding 17. Any adjoining pair of the plurality of pages, like first and second pages 16a, 16b, can be opened into a two-page spread 20. The two-page spread 20 has opposed side edges 24a, 24b distal to the binding 17. Book 10 is designed to closely fit in the device 100 with minimal movement. This is explained in more detail in U.S. Patent Application No. 60/384,476 filed May 31, 2002 and U.S. patent application Ser. No. 10/488,583, filed May 30, 2003, incorporated by reference herein. In particular, housing 110 has a book well 208 formed by combination of the base recess 128 and the cover recess 156. Well 208 is configured to closely receive the book 10 when the book 10 is in the upright, predetermined orientation, top, bottom, left and right sides of the book 10 proximal to top, bottom, left and right sides respectively of the well 208 and in particular, to have a clearance fit between the well and the book 10 or the two-page spread 20.

Figure 4:
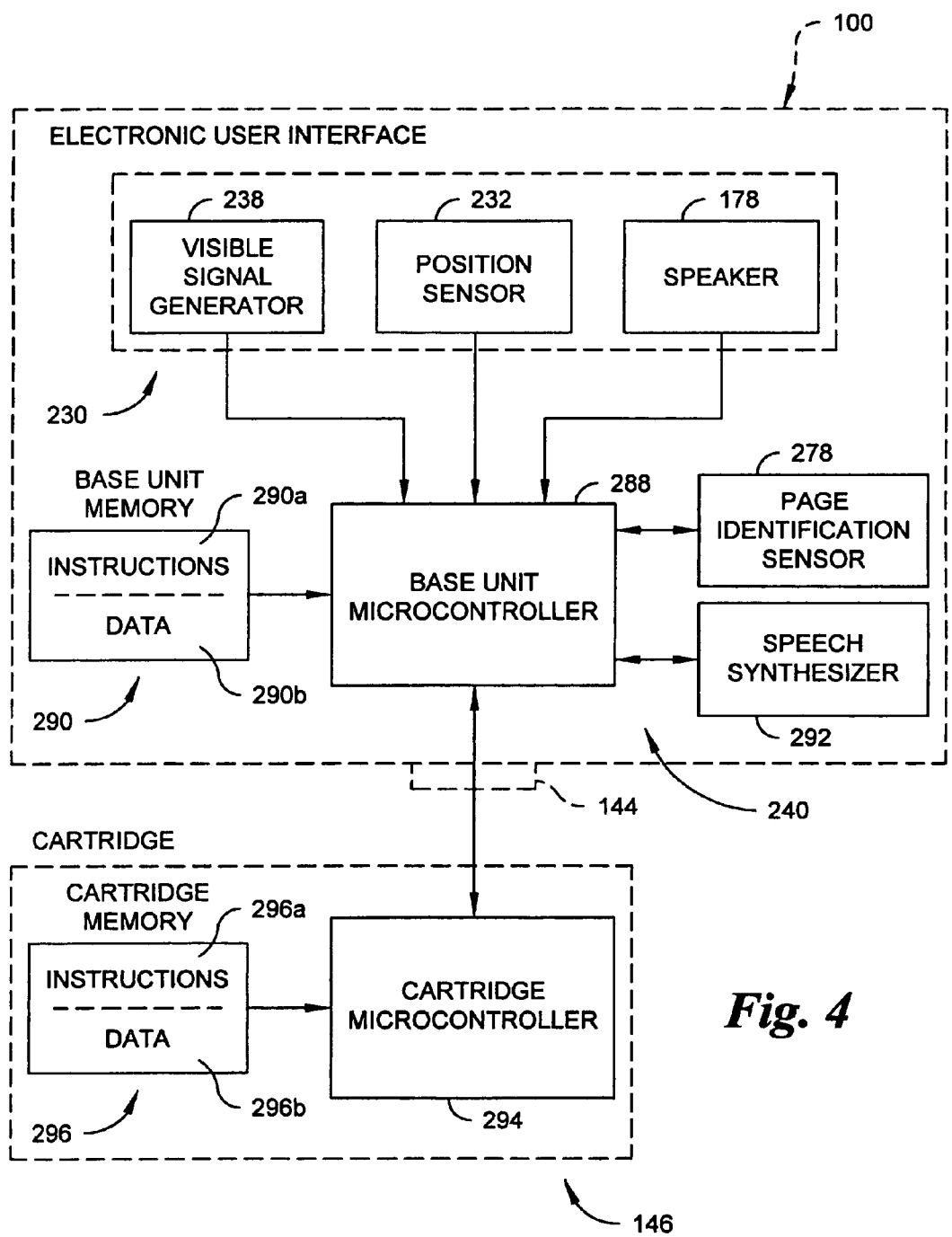
FIG. 4 is a schematic of the position sensor electronics of the device in FIGS. 1–3.

Referring to FIG. 4 there is shown in broad terms, the components of the electronics 240 of the device 100. The electronics 240 include a user interface 230 that comprises in addition to the position sensor 232 and the speaker 178, a visible signal generator assembly 238, controlling, for example LED's 150. Other user interfaces may be provided. Other depicted electronic components and circuits of the device 100 are the main controller or microcontroller 288, coupled with each of the components of the interface 230 as well as with a memory 290 and a speech synthesizer 292. The memory 290 may contain a non-volatile set of instructions 290a as well as a non-volatile set of data 290b, including, for example, a map of the book well 208 to identify the touch sensor locations of various icons like letters 274, 276 that may be provided on the recess surfaces 130, 158 covering the sensor elements. An external electrical connector 144 is provided for use with an appropriate constructed cartridge 146. Such cartridge would contain at least an accessible memory 296. Preferably, for the described system 100, the indicated cartridge 146 includes its own cartridge controller 294 and the cartridge memory 296 includes both firmware instructions 296a for running the microcontroller 294 and slaving the device controller 288 to the cartridge controller 294 as well as data 296b that relates specifically to a book or other printed element which is used with the cartridge 146 and the device 100. Also part of the electronics but not depicted in FIG. 5 are the power supply (battery and/or AC converter), the on/off switch 234 and the volume control switch 236.

Figure 5:
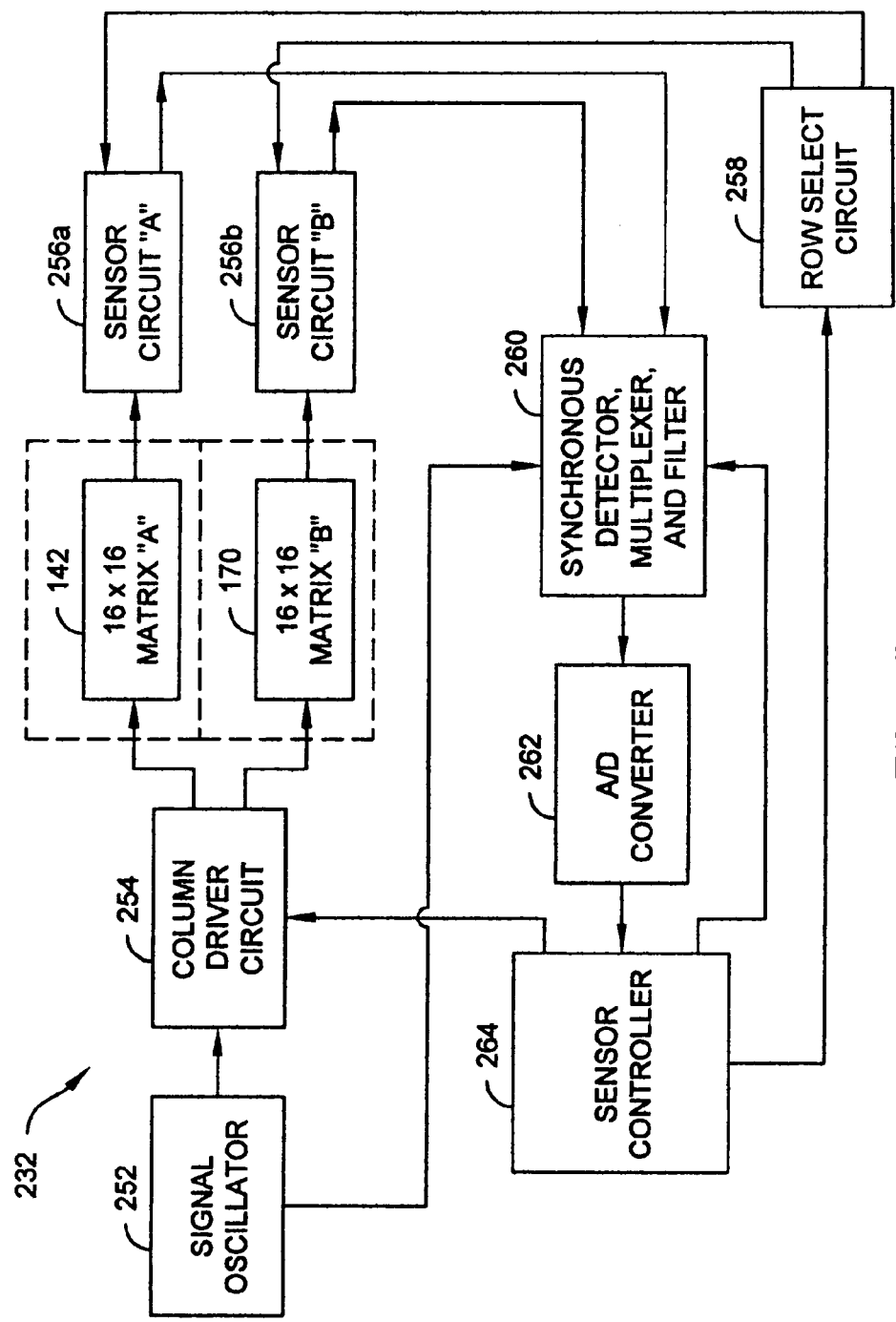
FIG. 5 is a schematic of the electronics for the device of FIGS. 1–3.

FIG. 5 depicts in block diagram form the positional sensor electronics 232 of FIG. 4. The sensor electronics 232 preferably are controlled by a dedicated sensor controller 264, for example a Sunplus SPL130A microprocessor, which is connected with and controls a column driver circuit 254, a pair of sensor circuits 256a, 256b through a row select circuit 258, a synchronous detector, multiplexer and filter circuit 260, which processes the raw sensor signals and passes processed signals to an analog to digital converter 262 for digitization. Alternatively, the functions of sensor microcontroller 264 might be performed by the device microcontroller 288. The position sensor 232 in device 100 further comprises the cross-point matrices or sensor arrays 142, 170 and a signal oscillator 252, which powers the arrays 142, 170 and controls the detector 260.

Figure 6:
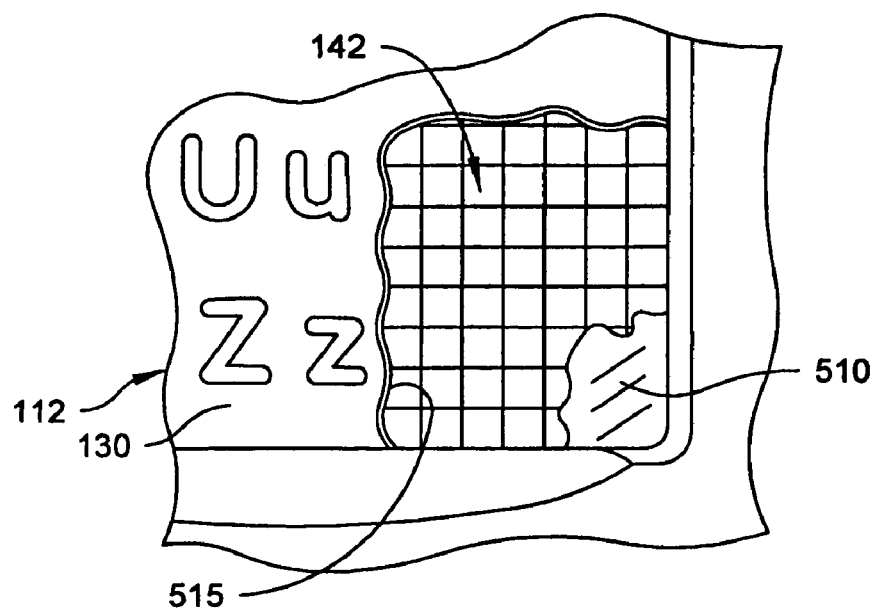
FIG. 6 is a fragmentary view of part of a corner of the device of FIGS. 1–3 depicting the construction of one of the cross-point sensor arrays.

Construction of the sensors 142, 170 in each housing element 112, 114 is indicated diagrammatically in FIG. 6, which depicts the position sensor components in the base 112. Sensor array 142 is located directly beneath a plastic spacer 515 forming recess surface 130. Spaced beneath sensor array or matrix 142 is an electrically conductive metal plate 510.

Figure 7:
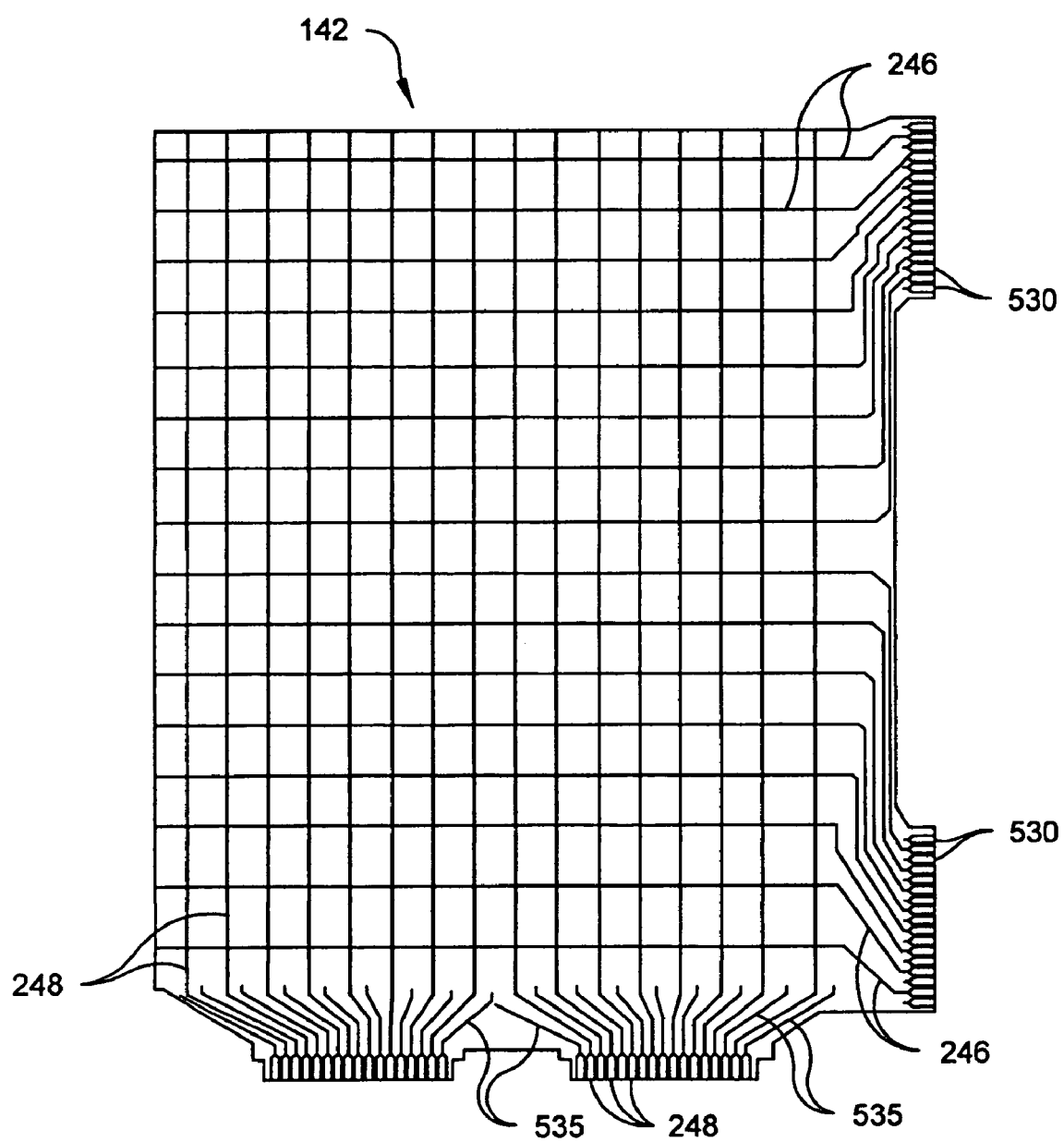
FIG. 7 is a top plan view of a schematic of the cross-point array (or grid) for the position sensor of the device in FIGS. 1–3.

Referring to FIG. 7, each of the matrices 142, 170 have two sets of general parallel, individual separate and separated conductive lines arranged as a plurality of spaced apart, column or vertical conductive lines (also referred to as vertical grid lines) 248 and a plurality of spaced apart, row or horizontal conductive lines or traces (also referred to as horizontal grid lines) 246 transverse and preferably perpendicular to the plurality of column conductive lines 248. Referring to the sets of lines 246, 248 as "rows" or "columns" for convenience, "rows" run east-west/left-right while "columns" are perpendicular (or otherwise transverse) to such "rows" running north-south/up-down, but the nomenclature could be reversed. The set of column conductive lines 248 and the set of row conductive lines 246 are separated by an electrically insulative spacer, for example a Mylar plastic sheet. The row and column conductive lines 246, 248 are suggestedly printed in conductive inks on opposite sides of the Mylar sheet to provide electrical isolation between the sets and form the matrix 170. FIG. 7 shows matrix 142 in accordance with an exemplary embodiment of the present invention. Matrix 170 is suggestedly a mirror image but could be of a different configuration and construction. Each matrix 142, 170 suggestedly includes sixteen rows 246 and sixteen columns 248 of the conductive lines or traces however different numbers of either or both can be used. Each point where a row 246 and column 248 line cross creates a single individual "cross-point" sensor. The sixteen by sixteen line arrays therefore create two hundred and fifty-six individual cross-point sensors arranged in a rectangular array in the recess 128, 156 of each housing half 112, 114.

Figure 8:
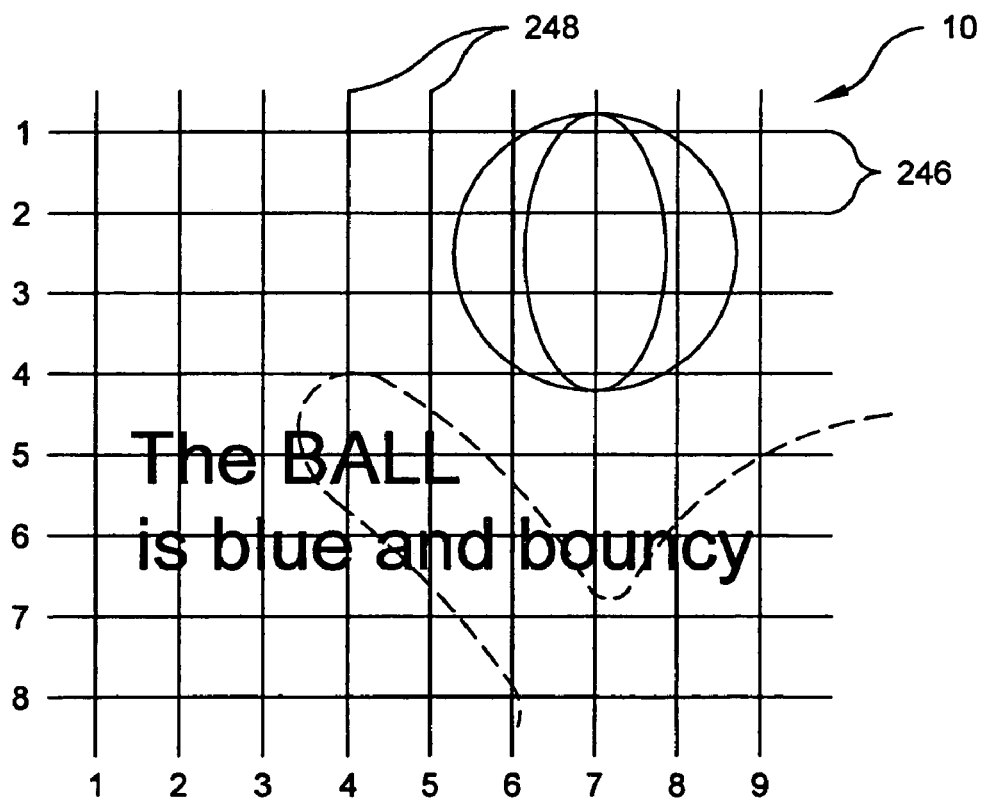
FIG. 8 is a schematic view of part of a book overlying part of a position sensor in the device of FIGS. 1–3.

FIG. 8 depicts schematically part of a book 10 placed on part of a sensor array 142 of the device 100 and, in phantom, the hand of a user selecting the word "BALL" with an extended pointing finger. The operation of the interactive book-reading device 100 allows a user to select any active area on the page of the book 10 by touching or simply pointing sufficiently closely to the selected area of the page with a finger. Upon selection of this active area, speaker 178 of the interactive book-reading device 100 outputs an audible message responsive to this selection. By way of example, when the finger touches the word "BALL", the interactive book-reading device 100 may produce a spoken audio output "BALL" from the speaker 178. The audible message is generated in direct response to the user touching the word "BALL". Different audible messages would be generated if the user touched other areas of the page, for example touching the word "blue" would generate an audible message "blue". Touching the ball graphic on the page could produce a sound of a bouncing ball. Touching any areas of the book page that do not have text or graphics could either generate a generic sound of a single bell ring to signify that there is no audio associated with this area, a generic spoken audio output such as "try again" or the input selection could simply be ignored. The interactive book-reading device 100 can therefore be used to read the book, create sound effects associated with graphics on the book or any other activity programmed to be responsive to a finger touch. It can readily be seen from FIG. 8 that each word and image can be mapped to one or more x and y coordinate pairs of either array 142, 170. For instance, the word "BALL" is located at R5, C4 and R5, C5 of the arrays. This location map is stored in memory along with the associated audible message that is played when either cross-point sensor location is selected.

Figure 9:
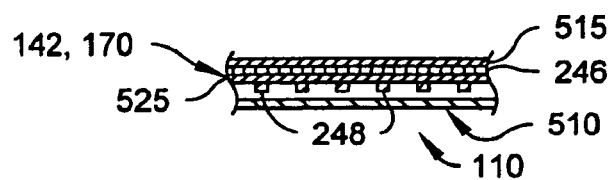
FIGS. 9–11 are diagrammatic sectional views of one sensor and the signals outputted from the sensor for no human contact, nominally maximum human contact, and nominally minimum human contact, respectively.
Figure 9:
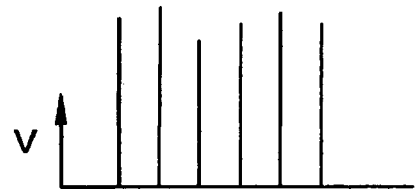
Figure 10:
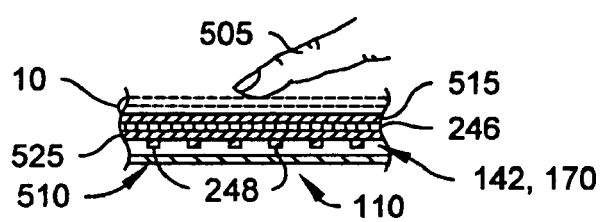
Figure 10:
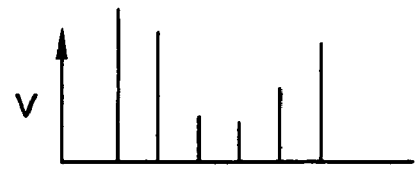
Figure 11:
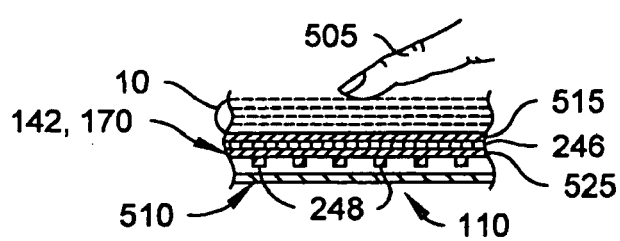
Figure 11:
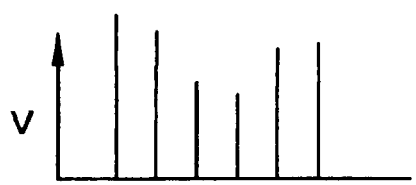

FIGS. 9–11 show examples of three cross-sections of the device 100 without and with book 10. The cross-section drawings show from FIGS. 9–11, the device 100 without book or removable printed element or user presence, and a finger 505 with pages 16 of a book 10 (at various thicknesses). Each FIGS. 9–11 further depicts a plastic spacer 515, a plurality of the spaced apart column (vertical) traces 248, the non-conductive (e.g. Mylar) sheet 525 and one of the spaced apart row (horizontal) traces 246 transverse to the plurality of column traces 248. The non-conductive sheet 525 supports and separates the column traces 248 from the row traces 246 and forms with those traces arrays 142, 170. The sensor preferably includes a conductive plane 510 in the form of a metal plate, connected to system ground and parallel to and spaced away from the arrays 142, 170.

The plastic spacer 515 which forms the upper surface 130, 158 of either recess 128, 156, is approximately 0.080" thick and is placed on top of either array 142, 170 to act as an insulator so that touch surface of the sensor is separated from the matrix 142, 170 by at least this amount. The spacer 515 may be a styrene or ABS with a dielectric constant between about 2 and 3 although the thickness and dielectric constant can be adjusted to achieve the desired sensitivity. The function of the spacer 515 is to provide a stable response from the matrix 142, 170. Eliminating the spacer 515 would cause the cross point sensors of the arrays to be much more sensitive, so highly sensitive that single pages 16 would dramatically change the output of the arrays 142, 170. The effect of adding pages is relatively negligible (e.g. 15–20 millivolt) with the spacer 515 in place but could be more than an order of magnitude greater without the spacer. By separating the pages 16 of the book 10 from the matrix 142, 170 by the thickness of the plastic spacer 515, the effect on the matrix 140, 162 is greatly reduced. As stated previously, the width and thickness of the column traces 248 (vertical columns) and row traces 246 (horizontal rows) should be kept to a minimum at the cross-points to reduce the capacitive effect at each of the cross-points but are preferably increased between the cross-points and around the cross-points, for example, by widening the individual row and column traces into four pointed stars or diagonal squares or the like around and between the cross-point locations.

Conductive plane 510 is suggestedly spaced about one-quarter inch (5 mm) below the matrices 142, 170. The conductive plane provides shielding for the matrices 142, 170 and as a result, affects the area sensed around each cross-point in the matrices 142, 170. The spacing of the plane 510 perpendicular to the planar arrays 142, 170 can be adjusted to adjust the size of the sensitive or sensing (i.e. user selective) area around each cross point so that the sensing areas of adjoining cross-points do not overlap.

Referring to FIG. 7, the individual traces 246, 248 are extended to side and bottom edges of the sheet 525 supporting the traces. Preferably, shorter traces 530 and 535 are extended from the side and bottom edges, respectively, of the sheet 525, one shorter trace 530 or 535 on either side of each sensor trace 246 or 248, respectively. The shorter traces 530 and 535 are all connected to system ground through or with the conductive plane 510. The horizontal traces 530 extend inwardly from the vertical edge to just beyond where the row traces 246 widen out to form terminals and, with a uniform length, provide some impedance control. The vertical traces 535 extend from the bottom edge up to a point where the vertical traces 248 begin to run parallel, just below where those traces are flared and to within about one-half inch (12 mm) of the lowest cross-points. Traces 535 prevent cross coupling between the column traces 248 when the columns are being driven by oscillator 252.

Generally speaking, the values of signals generated by matrices 142, 170 are read and stored without human interaction with the arrays to obtain a reference value for each cross-point. The reference value of each cross-point sensor is individually determined and updated. Preferably, each is a running "average" of successive scan values (e.g. about sixteen) for the cross-point. Successive scans are compared to the reference values to determine the proximity of a human finger or other extremity. In accordance with a preferred embodiment of the present invention, data is accumulated starting at zero when the device 100 is powered on. A side effect of this is if the user has his or her finger on the matrices 142, 170 when this process takes place, the reference values for the touched points are lower than they would be without the touch.

Operation of the sensor 232 is as follows. Although not required, the sensor 232 preferably is read by reading the individual touch point sensors one row at a time alternating arrays 142, 170 for each row 256. Firmware associated with microcontroller 264 directs the column driver circuit 254 to pass the RF excitation signal, for example, a 250 kHz, 3300 milliVolt square wave signal, from oscillator 252 to column traces 248 of the two arrays 142, 170, preferably in sequence, driving the same positioned column in each array 142, 170 together. The firmware also directs the row select circuit 258 to generate appropriate control signals sent to the (row) sensor circuits 256a, 256b to alternately connect the same positioned row trace 246 in each array 142, 170 to the synchronous detector, multiplexer and filter circuit 260 as the column traces 248 are sequentially driven across each array 142, 170. The controller 264 further controls the transfer of data from circuit 260, which generates a dc level analog voltage signal, through A/D converter 262. Corresponding rows 246 are sampled on each array 142, 170 before the next successive row is sampled, all with the same driven column in each array. Thus, the firmware cycles the arrays 142, 170 fastest, the rows 246 second fastest and the columns 248 slowest. Preferably but not necessarily, the rows 246 are scanned bottom to top while the columns are driven innermost to outermost (right to left for 170, left to right for 142).

After the initial values from arrays 142, 170 are stored, the arrays 142, 170 are cyclically and continually scanned, and the results for each cross-point sensor are compared with the stored reference values, which are themselves cyclically and continuously updated. If any individual cross-point sensor value has a differential from its reference value that is greater than a predetermined or threshold amount ("Threshold"), the controller 264 will mark the point as "touched" or "selected". A fixed threshold is established for the device 100 by characterizing the device 100 during manufacture. For the circuitry, materials and structure described, it has been found that with an applied 3300 milliVolts, 250 kHz square wave signal, individual cross-point sensors of the arrays 142, 170 output signals of about 2200 milliVolts±400 milliVolts without user interaction. Deflection of the signal (i.e. a drop in detected signal strength) at each cross-point sensor location for user contacts ranging between that of a large adult directly touching the recess cover surface to a small child touching the top of a closed book 10 on the top of such surface range from about 1600 milliVolts in the first case to only about 200–300 milliVolts in the second case. The threshold should be set as close as possible to the smallest expected user generated deflection. In this device 100 being described, the threshold is suggestedly set for less than 200 milliVolts, preferably between about 190 and 200 milliVolts, for each cross-point sensor. If the measured voltage value for the cross-point being sensed is less than the reference value in memory by an amount equal to or greater than the threshold amount, the point is considered touched and is "marked" as such by the sensor controller 264. If the difference is less than the threshold, the reference value is updated each 64 milliseconds period (full scan time), resulting in a settling of the reference values after about one second. After the matrices 142, 170 are scanned, cross-points that have been "marked" as a touched for two scan cycles are considered valid and selected for further processing by a "best candidate" algorithm as will be described.

For the described device 100, every 250 microseconds, two (2) cross-points (identically-positioned cross-points associated with each array 140, 172) are preferably scanned and the associated data clocked into the sensor controller 264. For each sensor scan, each cross-point data value is preferably initially compared to a "High Limit" value. If the data value exceeds this High Limit value, it is ignored as a candidate for that scan and ignored for updating the reference value for that sensor. The purpose of the High Limit value is to prevent abnormally high data values from causing a cross-point sensor to appear permanently pressed. To understand the mechanism behind this requires an understanding of the concepts described below. Therefore, the function of the High Limit will be described later in this section.

As noted above, for each array scan, each time the data value associated with a cross-point sensor is read, it is compared against the reference value, which may be thought of and herein referred to as a "Running Average" associated with that cross-point sensor (see below). If the data value is less than the Running Average minus the Threshold, the cross-point sensor is considered "touched" for that scan. The Threshold is the fixed data value mentioned above (i.e. 190 to 200 milliVolts), which represents the minimum deflection which is expected to indicate that a cross-point sensor is considered touched.

If the data value does not indicate that the cross-point sensor is considered touched (that is, data value<[Running Average−Threshold]), then the data value is used to update the Running Average. Upon power-up of the system, the Running Average for each point is set to zero. Each time the data value for a cross-point sensor is not greater than the High Limit, and not low enough to indicate that the cross-point sensor is touched, the data value is used to update the Running Average for that point. The formula used to compute the new Running Average is as follows:

$$\text{New Running Average} = \text{Running Average} + (\text{data value} - \text{Running Average})/16$$

Thus, the preferred "running average" is not truly an average but rather a convergence algorithm.

With the above knowledge, the function of the High Limit algorithm can now be explained. The reference value/running average algorithm can be fooled by situations where high levels of interference exist and the cross-point sensor readings climb significantly. Without the High Limit cut-off, abnormally high data values (due to a continuous noise source) could eventually result in an abnormally high Running Average for a given cross-point sensor. Then, when the scanned data values return to their nominal value range, if the data values being scanned are low enough such that the data values are greater than the abnormally high Running Average minus the Threshold, the cross-point sensor will be considered touched. This will result in newly scanned data values never being used in the calculation of the Running Average and therefore, will not allow the Running Average to be lowered to it's normal level, causing the cross-point sensor to appear permanently touched during the duration of use of device 100. Consequently, the only sensor data which is used or stored is that data which is less than the High Limit. For device 100 as described above, a High Limit value of 3100 milliVolts (about fifty-percent higher than the nominal voltage) is suggested.

Figure 12A:
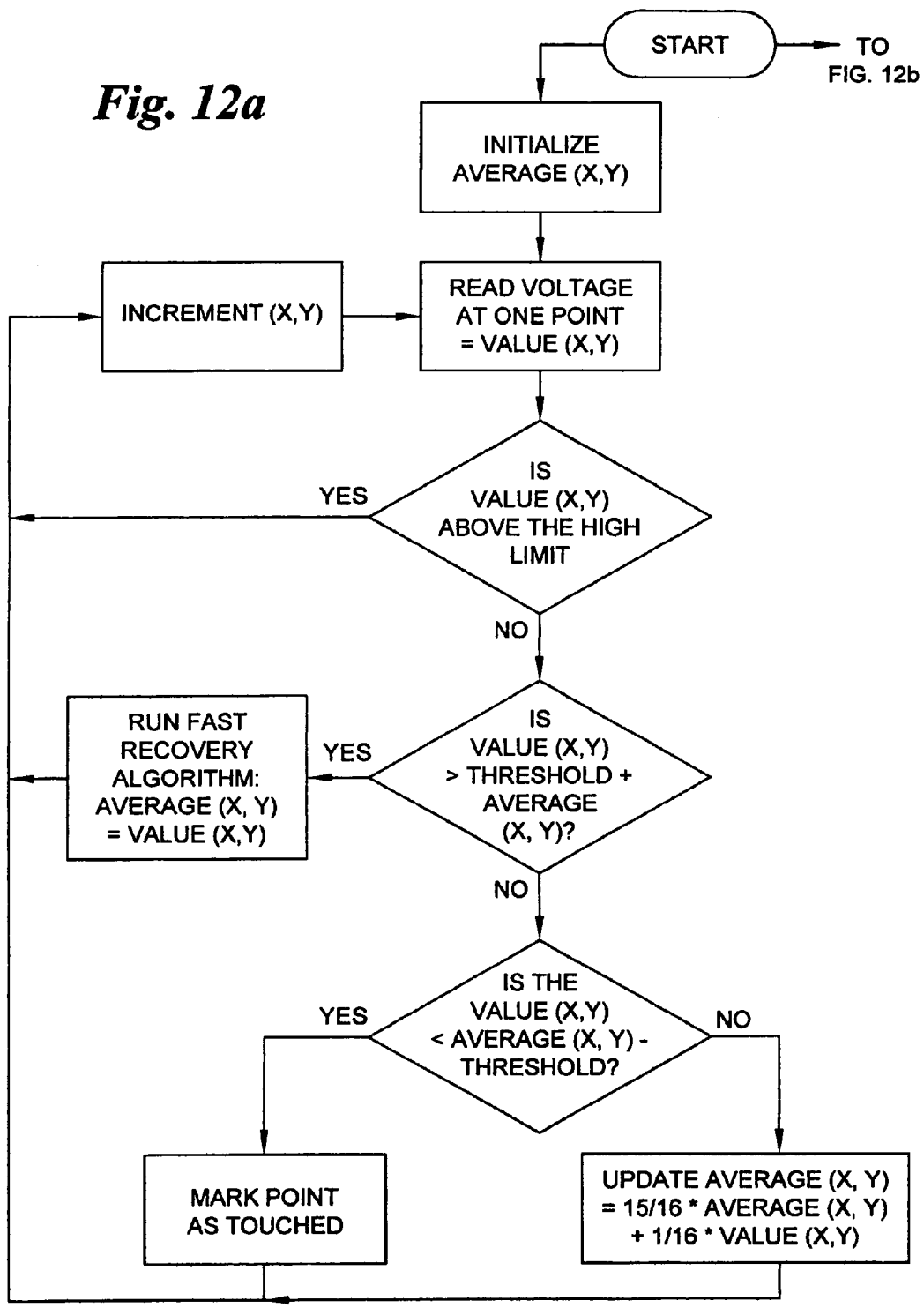
FIGS. 12a and 12b are flow diagrams of the touch identification process.
Figure 12B:
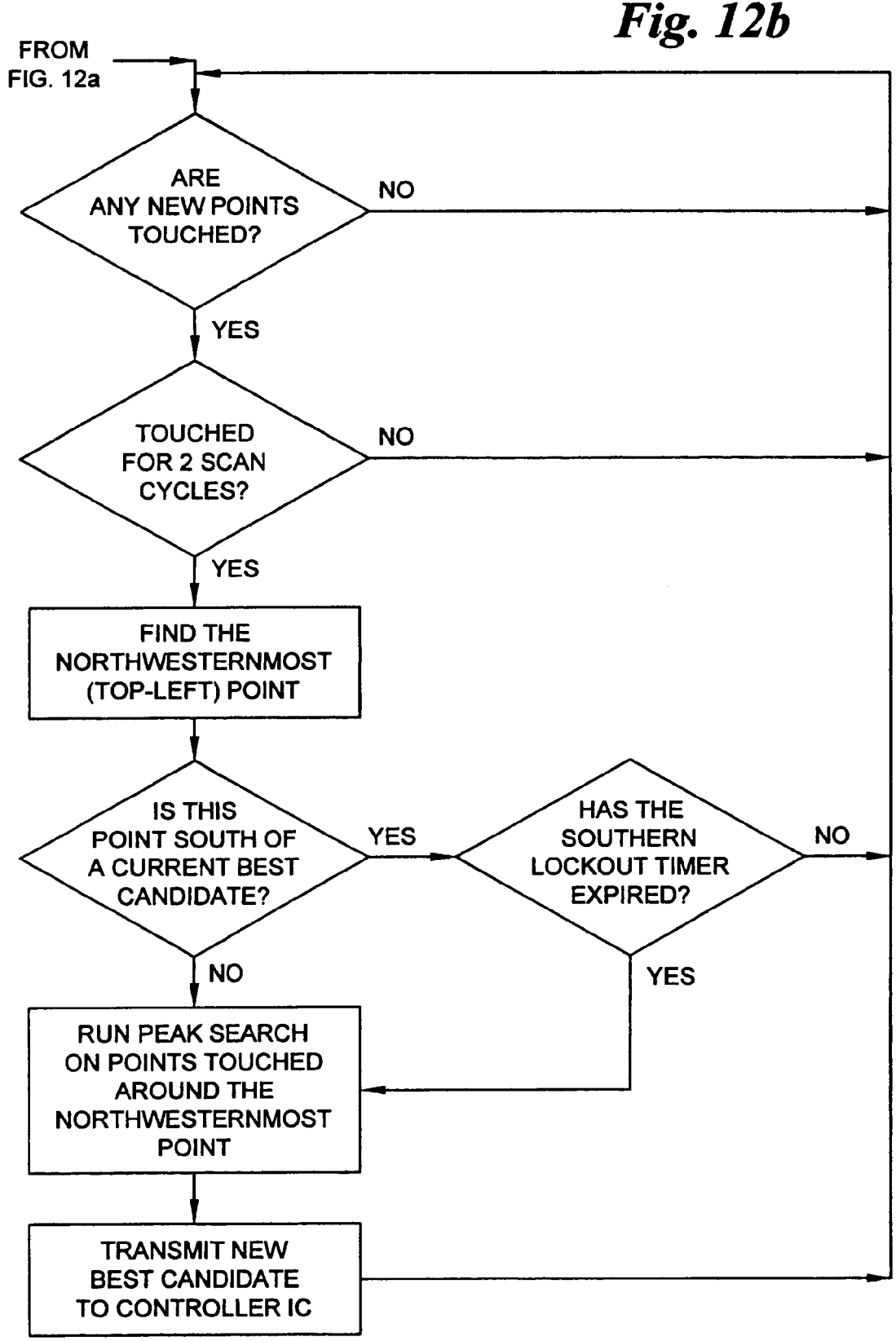

In the preferred embodiment, the device 100 further includes a "Fast Recovery" algorithm. This compares the latest reading from a cross-point to the reference value or Running Average. If the latest reading if higher by more than the Fast Recovery Threshold, the reference value will be set equal to the latest reading. This algorithm counters a situation where the user "hovers" a finger over a point for an extended period of time, which artificially forces the reference value down. A quick release and touch of the same point in this situation may cause the system not to respond because the differential between the reference value and latest reading is not more than the touch threshold value (Threshold). FIG. 12 summarizes the steps followed in identifying "touched" sensors and in updating the reference values/Running Averages.

The previous section described in detail how each of the 512 (16×16×2) cross-point sensor arrays 142, 170 are determined to be activated (i.e. "touched" or "selected") or not. To scan the entire array of cross-points one time takes approximately 64 milliseconds (16×16×250 microseconds). During each scan, every cross-point sensor is considered to be activated/touched or not.

After each scan, the touched points are processed to identify a "best candidate". Generally speaking, the best candidate is the cross-point sensor selected by the sensor microprocessor as being the point most likely to have been selected by the user in touching the sensor. Generally speaking, it is the touched point which is highest (most northern/Top) or the highest and most left (i.e. most northwestern/Top Left) if two potential candidates of equal height are activated on a given sensor array 142, 170. For convenience, these will be referred to collectively as simply "the most northwestern" point. Also, the cross-point sensor preferably must be "touched" for two consecutive 64 millisecond scans to be considered as the new most northwestern point of the sensor. The process is also depicted in FIG. 12.

The sensor controller 264 first identifies a set of touched sensors. It next identifies those which have been touched for at least two consecutive 64 millisecond cycles. These are the new most northwestern candidate sensors. Preferably, the left hand array 140 is processed for new most northwestern candidates before the right hand array 172 is processed and the left hand array given priority over the right hand array in each scan. What this means is that if a new most northwestern candidate point/sensor identified on the left hand array is lower than a new, higher most northwestern candidate point/sensor identified on the right array, the left array candidate will still be selected as new most northwest point/sensor for processing for best candidate. Once the best candidate has been chosen, its identification/location is communicated from the sensor controller 264 to the base unit microcontroller 288.

The priority of the left hand array over the right hand array, described above, only comes into effect when a cross-point sensor on each array is first touched within a single 64 millisecond scan. However, it can extend to a two scan (128 milliseconds) "preferential treatment" for the left hand array if desired. Both scenarios are described in the following examples:

If a relatively lower cross-point sensor in the left hand array 142 and a relatively higher cross-point sensor in the right hand array 170 are both touched during the same 64 millisecond scan, the cross-point sensor on the left sensor array 142 is chosen as the potential new most northwestern point if that same left sensor array cross-point is still touched during the next scan.

If a relatively higher cross-point sensor on right sensor array 170 is touched and chosen as the potential new most northwestern candidate during a 64 millisecond scan cycle, and if a relatively lower cross-point sensor in left hand array 142 is touched during the next 64 millisecond scan cycle and is the new most northwestern point candidate of that array, then the new most northwestern point sensor (the lower cross-point sensor) in left hand array 142 is chosen as the new most northwestern point candidate, if that left array point is still touched during the next scan and is processed accordingly.

Once a new most northwestern point (cross-point sensor) has been chosen, preferably a "Southern Lockout" algorithm takes effect for that array 142 or 170. The Southern Lockout algorithm causes any point of the same array touched in subsequent scans below the new most northwestern point to be ignored until the earlier of one second expiration while the new most northwestern point remains selected, or the new most northwestern point is released. After the lockout, all cross-points of the array become candidates for new most northwestern point. This algorithm covers the situation where the user rests the heel of the pointing hand on the array after finger touching the array.

The Southern Lockout, when used, preferably only takes effect for the one array 142, 170 on which the new most northwestern point/sensor resides. That is, the following scenario can occur. The new most northwestern point/sensor is selected from the right array. All other cross-point sensors on that particular array which are south of the new most northwestern point/sensor are "locked out" for one second or until the new most northwestern point/sensor is released. During that one second period, a cross-point sensor on the left array, which is the most northwest sensor candidate touched on that array, can be selected as the new most northwestern point of the two arrays if it is touched for two consecutive scans. This is a result of arbitrarily giving the left sensor array 142 priority between the two arrays 142, 170.

Preferably, a "Peak Search" algorithm is employed after a new most northwestern point of the sensor (two arrays 142, 170) is identified. The deflection of the cross point sensors immediately East (right), South (below) and Southeast (below right) of the new most northwestern point sensor are examined for touch and the relative deflections of any touched sensor of the four compared to one another. The one sensor of those up to four sensors having the greatest deflection (i.e. change from reference value/Running Average) is selected as the "Best Candidate" and its identity/location/position is passed to the main (base unit) microcontroller 288.

Each time a new best candidate is selected, its position is transferred by the sensor control circuit to the main (base unit) control circuit 288. Since it takes only two 64 millisecond scans to determine a best candidate and it is possible to find a potential new best candidate on either array consecutively, it is possible that a new best candidate could be sent to the main controller 288 on consecutive scans. The main controller 288 would then decide how to use this information (interrupt current activity or not, use a neighbor cross-point sensor instead of the best candidate, etc.).

The device 100 will also look to see if there are multiple hands placed on the book 10 due to the user inadvertently placing more than one hand on the book. In the event that the book reader sensor sees two hands placed on the sensor, it will look to see if either input is a clearly defined most northern point. If so, it will select this input as best candidate. Instead of having to generate an audio output to direct the user to use "one finger at a time" or any other appropriate statement when the device 10 cannot determine with reasonable accuracy the likely input, the present invention can select a "best candidate" based on the above-mentioned algorithm.

Figure 13:
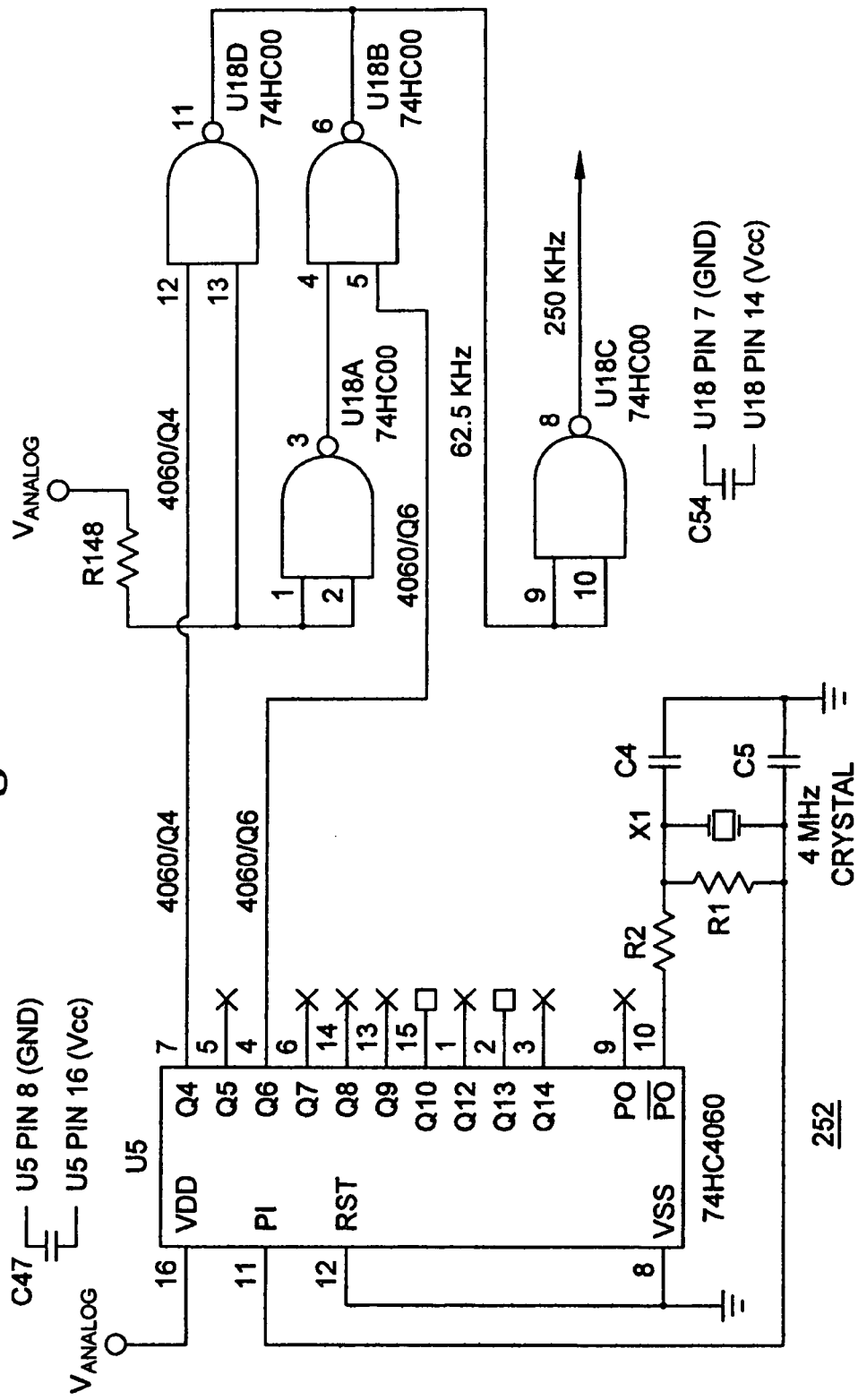
FIG. 13 is a detailed schematic of a currently preferred oscillator.

FIG. 13 is a schematic of a currently preferred signal oscillator circuit 252. The signal oscillator circuit 252 generates and supplies a square wave signal having a frequency of approximately 250 kHz at 3.3 V to column driver circuit 254. The same signal is passed via line 253 to the synchronous detector, multiplexer and filter circuit 260 for synchronous detection of the array coupled oscillating signal.

Figure 14:
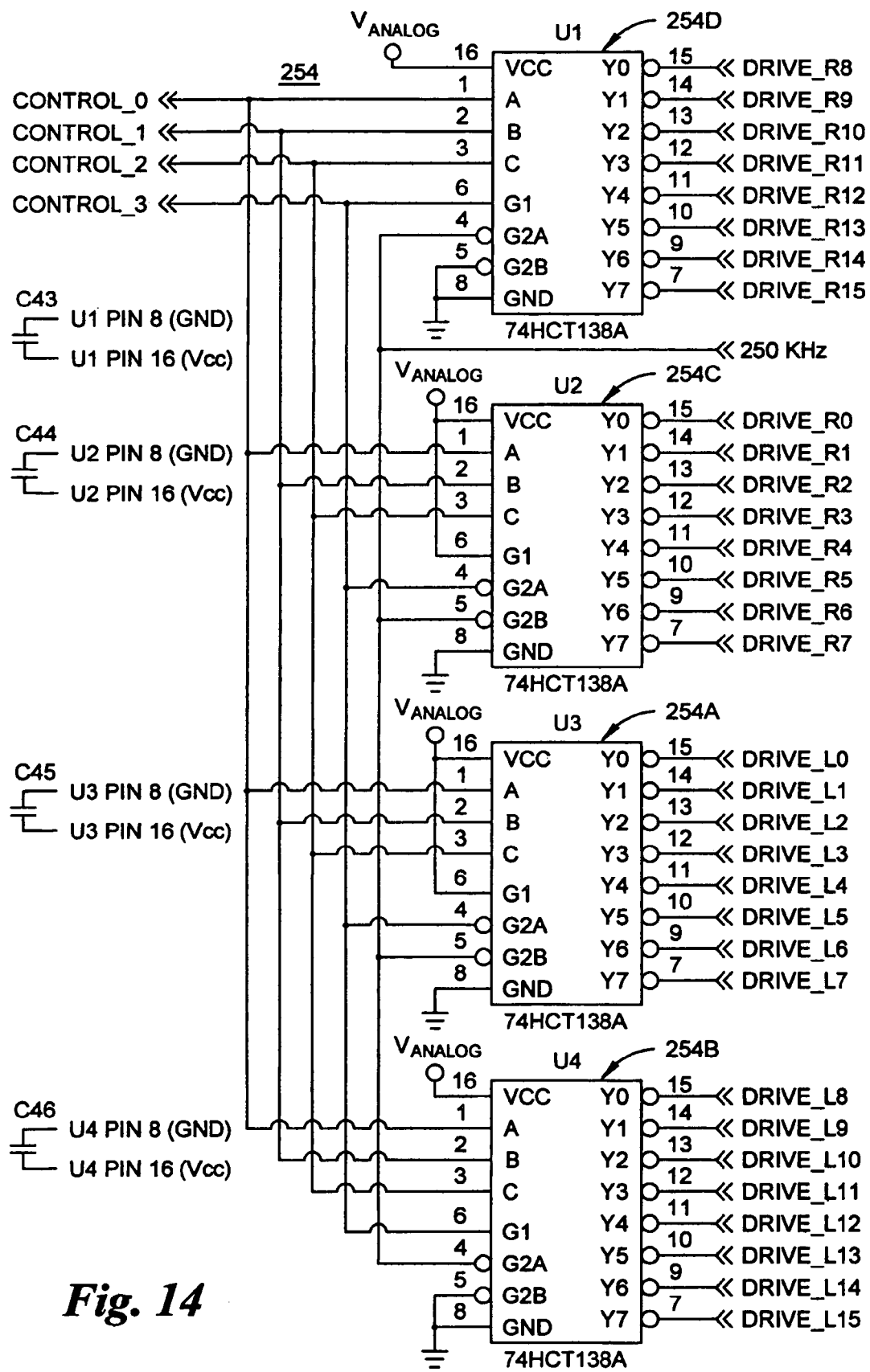
FIG. 14 is detailed schematic of a currently preferred column selector circuit.

FIG. 14 is a schematic of a currently preferred column driver circuit 254. Column driver circuit 254 sequentially excites the column lines of the matrices 142, 170, one pair of corresponding lines at a time under the control of circuit 264. Preferably four multiplexers 254a–254d are used to drive the thirty-two column traces 248 in the two arrays 142, 170.

Figure 15A:
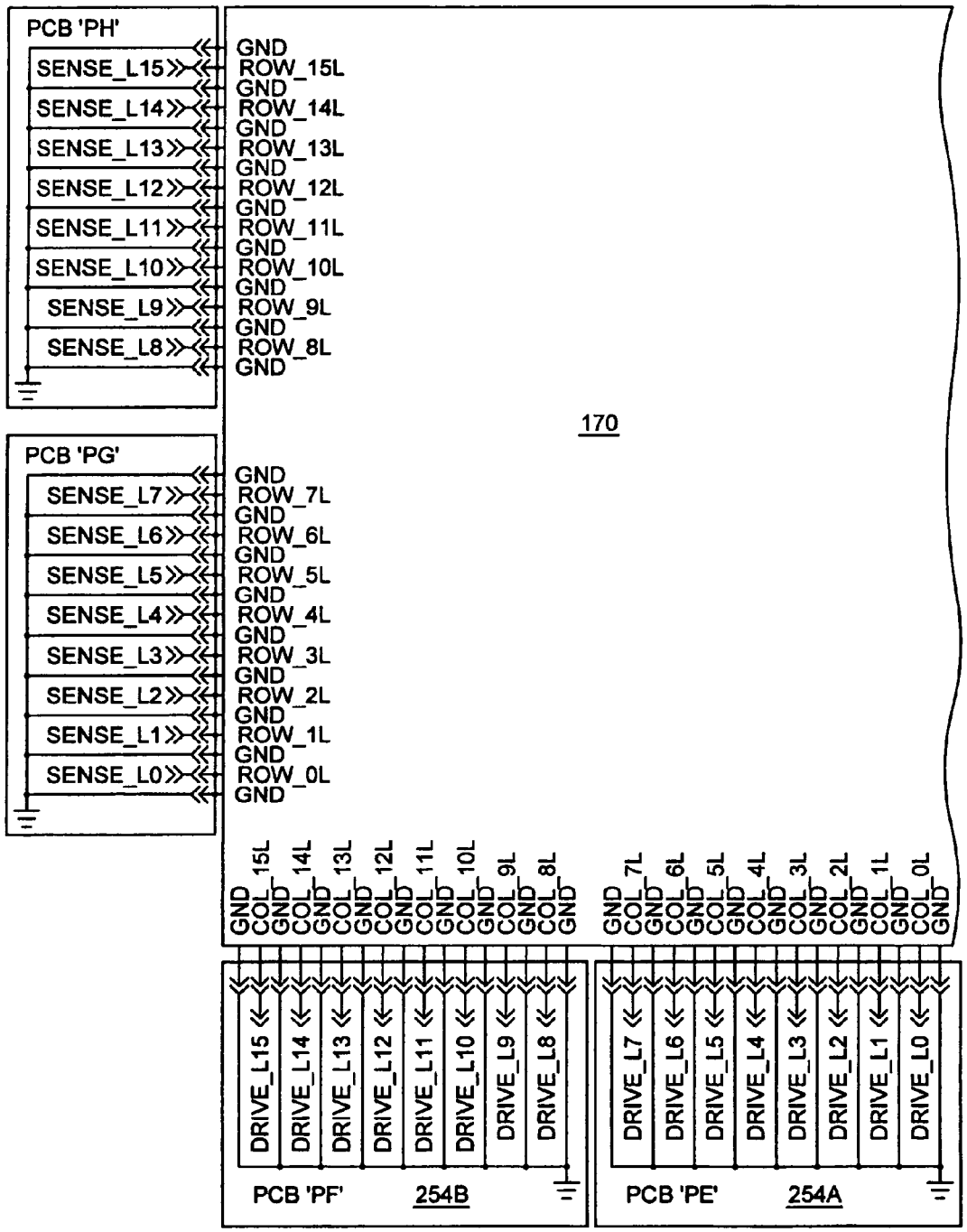
FIGS. 15a and 15b are detailed schematics of the suggested connections of the cross-point sensor arrays to the other components of the sensor circuitry shown in the other figures.
Figure 15B:
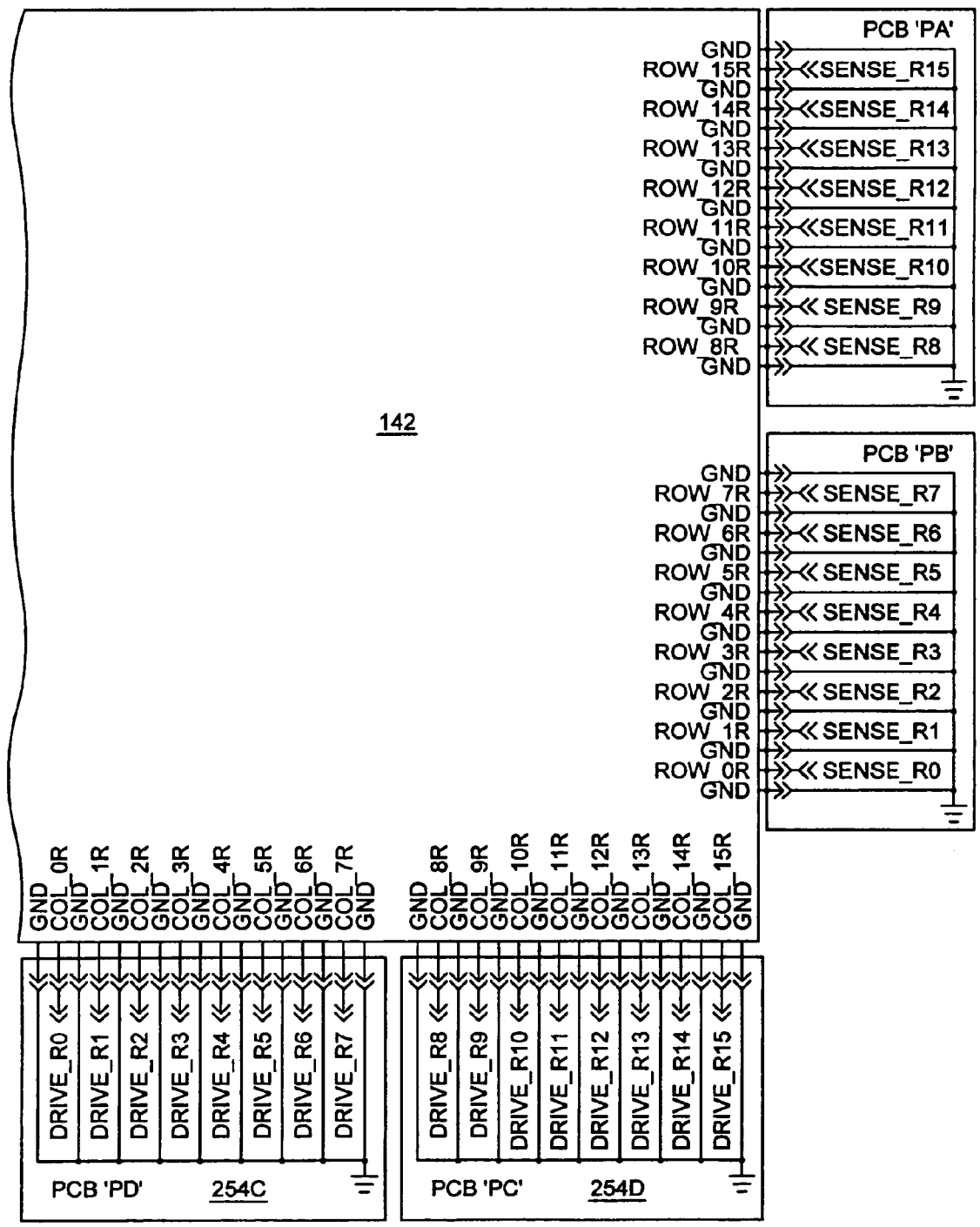

FIG. 15 is a schematic diagram of currently preferred connections of the two cross-point sensor array 142 with the column driving and row sensing circuit elements. Array 170 is suggestedly a mirror image.

Figure 16:
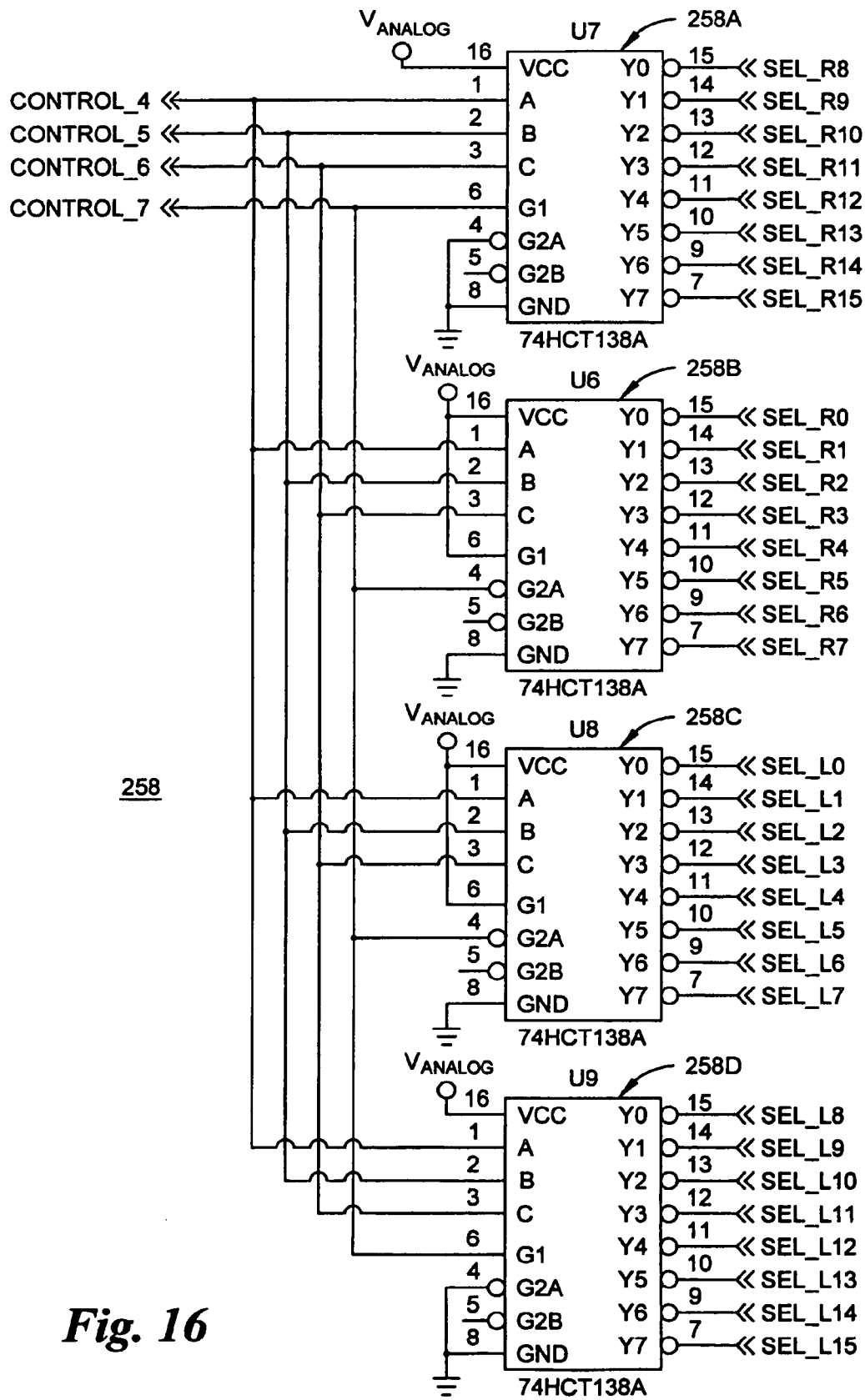
FIG. 16 is detailed schematic of a currently preferred row selector circuit.

FIG. 16 shows schematically, a currently preferred construction of the row select circuit 258, which is also formed primarily by four multiplexers 258a–258d.

Figure 17:
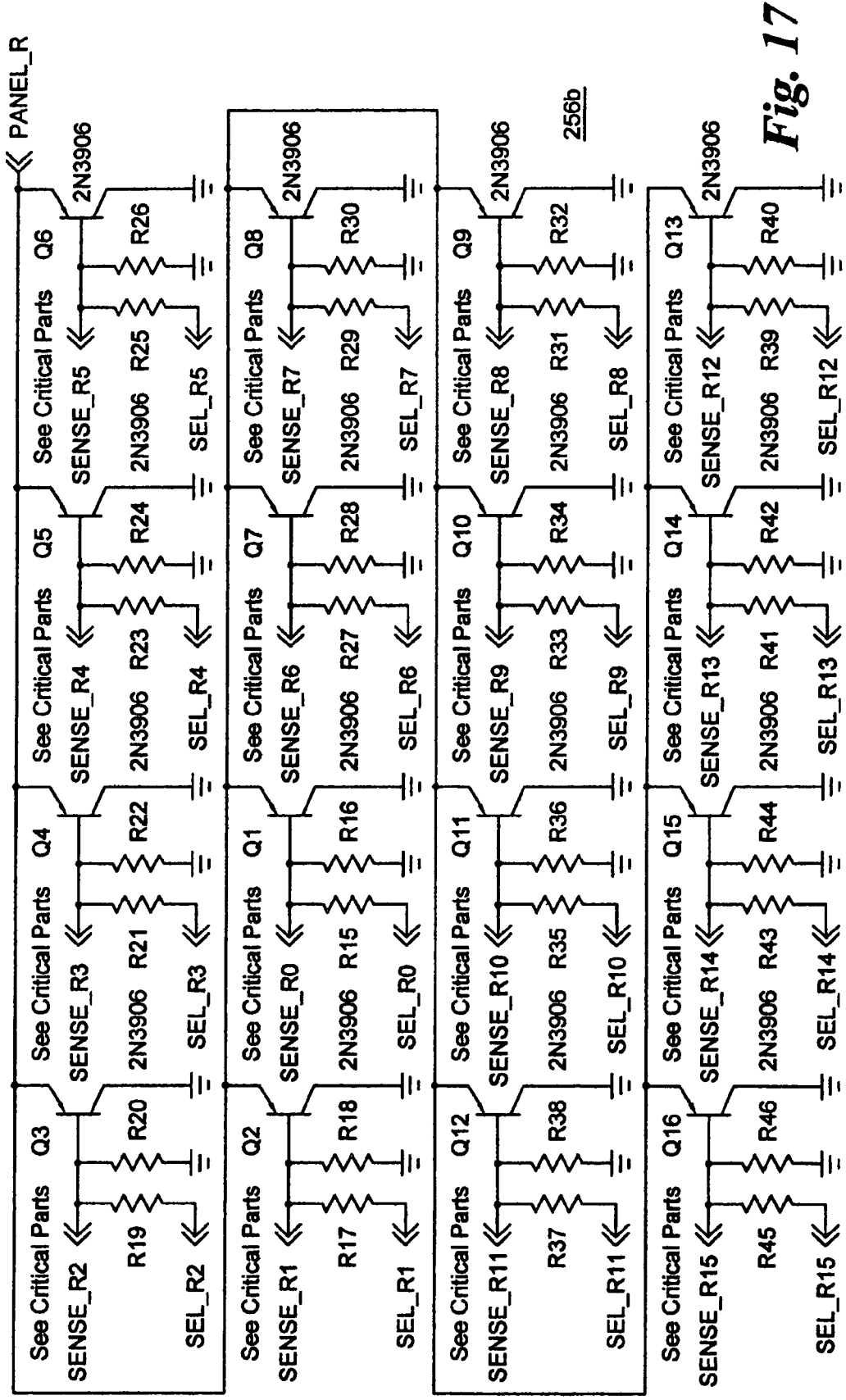
FIG. 17 is a detailed schematic of a currently preferred row sensor circuit.

FIG. 17 depicts a currently preferred construction of one of two preferably identical sensor circuits, sensor circuit "B" (256b of FIG. 5), which detects signals from the row traces 246 of the right sensor array 142 shown in FIG. 15 and forwards the detected signal output ("PANEL_R") to the synchronous detector, multiplexer and filter circuit 260 under control of the row select circuit 258. These sensor circuits 256a, 256b impose a high impedance load on the coupled row traces 246 through the use of individual transistor/amplifiers Q1–Q16 in the depicted circuit 256B. The outputs (SENSE_R1 through SENSE_R16) are maintained normally high by the row selector circuit 258 and dropped for individual transistors Q1–Q16 by that circuit when a row 246 is being "sensed".

Figure 18A:
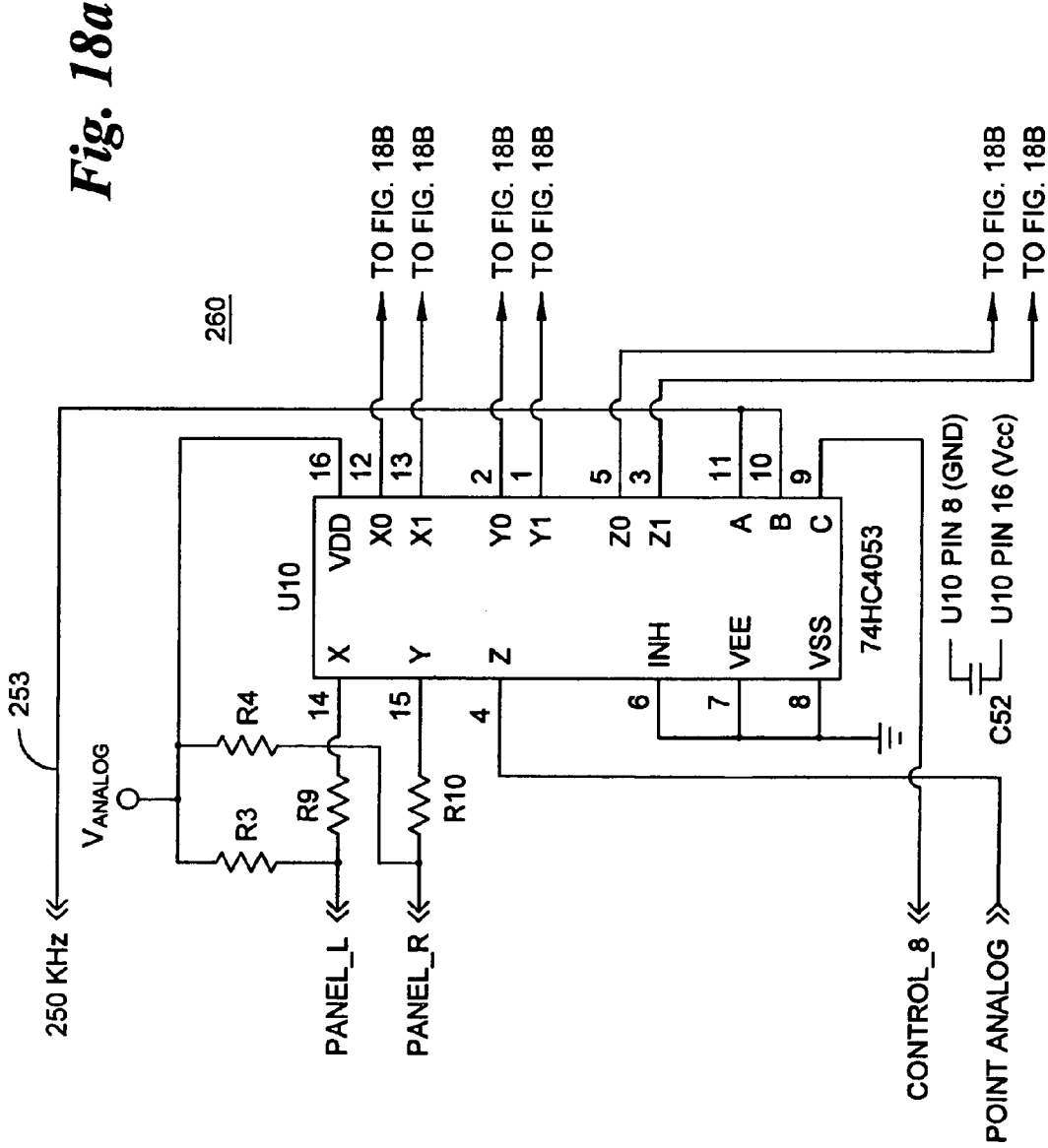
FIGS. 18a and 18b are detailed schematics of a currently preferred synchronous detector, multiplexer and filter circuit.
Figure 18B:
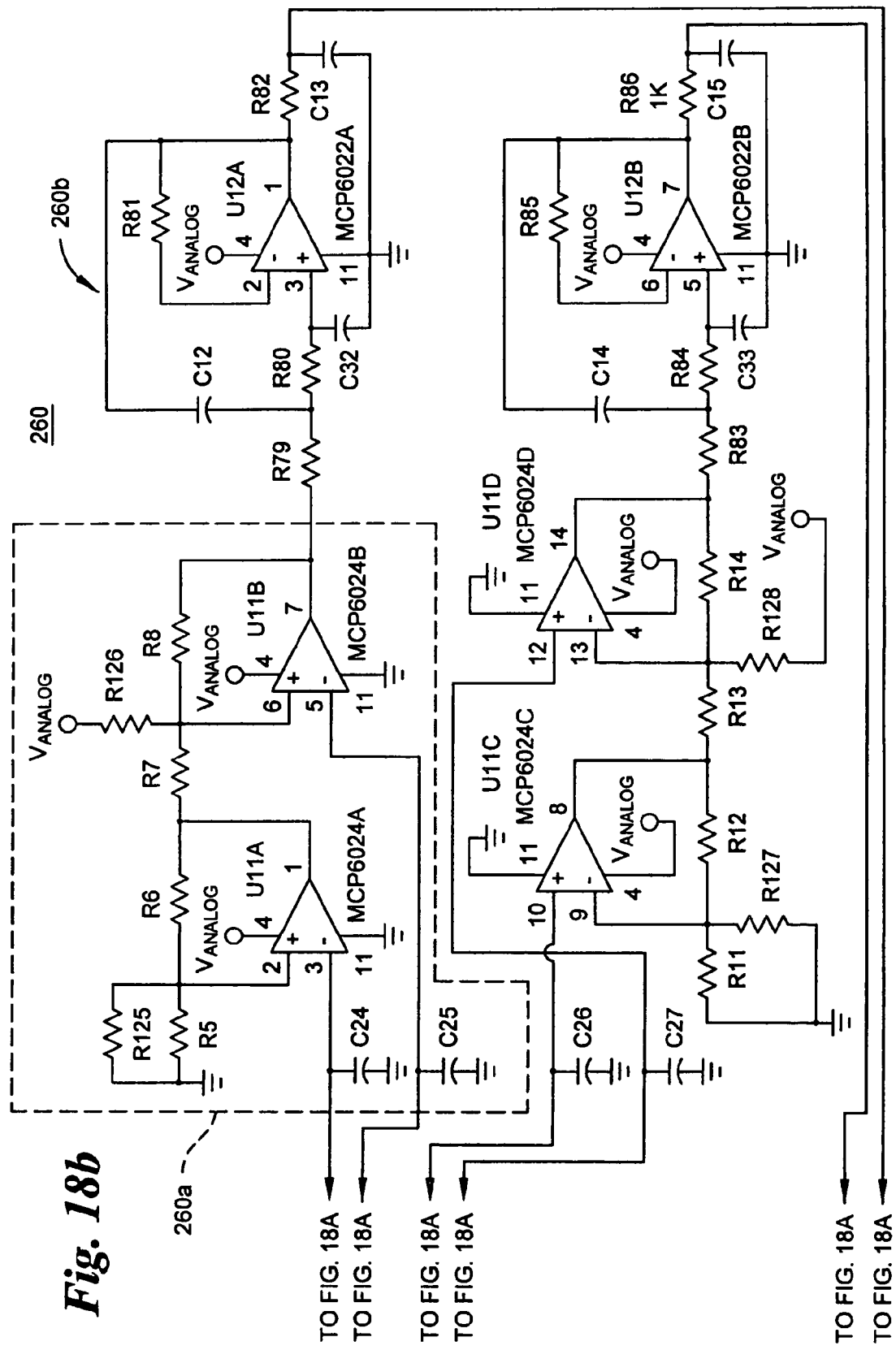

FIG. 18 is a schematic of a currently preferred construction of the synchronous detector, multiplexer and filter circuit 206 showing outputs of arrays 142, 170 (PANEL_L, PANEL_R), the analog output (POINT ANALOG) of circuit 260 and the timing input (CONTROL_8) from the sensor controller 264. The circuit element "U10" is a multiple switch chip that couples the output of the left sensor array 140 with a synchronous detector/differential amplifier 260a formed by capacitors C24 and C25 and amplifiers U11A and U11B with related circuitry. The output of that detector/amplifier pair is passed to a filter 260b formed by amplifier U12A and related circuitry and returned to pin Z0 for multiplexing by chip U10 to the A/D converter 262. The parallel circuit connected to pins Y0, Y1 and Z1 operates on signals from the other array 172. The circuit 260 operates at the 250 kHz rate of the output signal of oscillator circuit 252 on line 253.

Figure 19A:
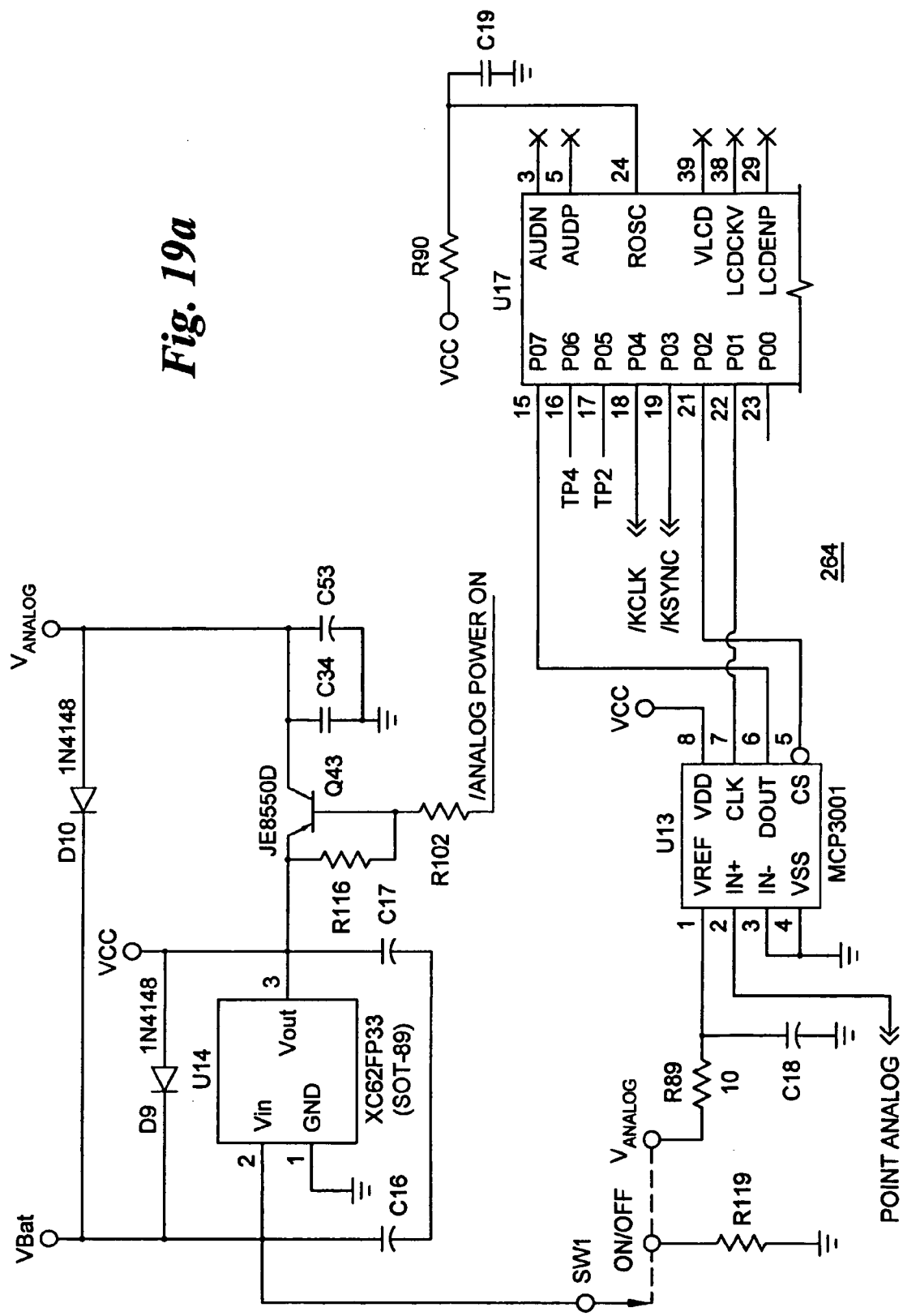
FIGS. 19a and 19b are detailed schematics of a currently preferred sensor controller.
Figure 19B:
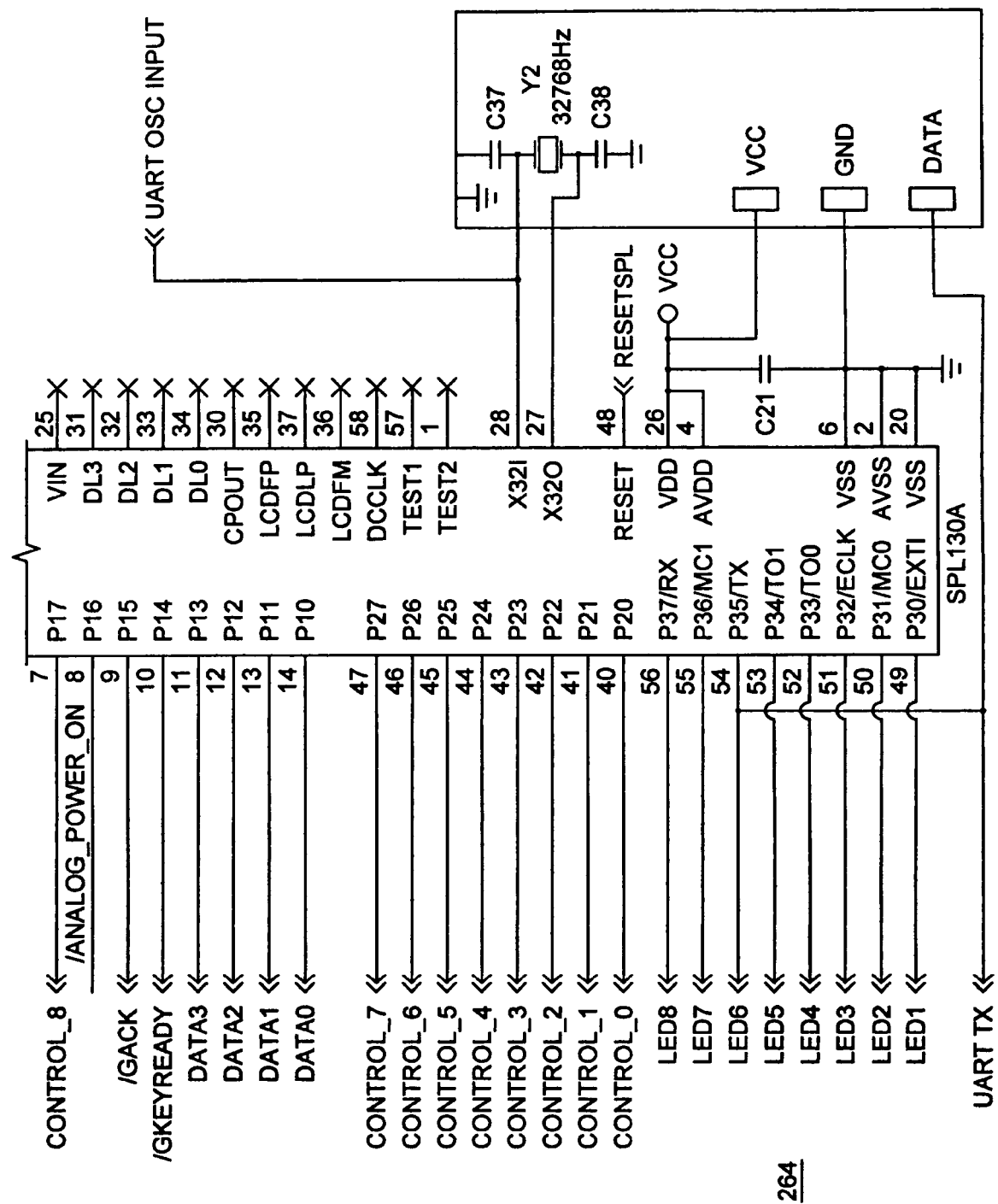

FIG. 19 shows a currently preferred construction of the sensor controller or control circuit 264. Control circuit 264 preferably includes a general-purpose microprocessor, such as Sunplus™ Part No. SPL130A, or the like. The A/D converter might be a MicroChip MCP 3001 external A/D converter. The power supply (not depicted) of device 100 provides power to sensor circuit 232.

It will be appreciated by those skilled in the art that changes could be made to the embodiments described above without departing from the broad inventive concept thereof. It should be appreciated that the present invention can be used directly, for example, without a book or card or sheet, but with indicia formed or printed on an upper surface over the circuit with software responsive to the designation of different locations on the surface by touching or nearly touching the location on the surface. In this way, the present invention could be used in place of other conventional touch screens in other book-reading devices as well as in other educational and entertainment device. It is understood, therefore, that this invention is not limited to the particular embodiments disclosed, but it is intended to cover modifications within the spirit and scope of the present invention as defined by the appended claims.

We claim:

1. An electronic user input device having a platform with a first, generally planar, user contact surface overlying a first, generally planar sensor, the first sensor being formed by separate and separated first and second sets of generally parallel, individual conductive lines transversely crossing over each other beneath the user contact surface of the platform, each pair of crossing lines defining a cross-point, the device characterized by:
 a radio frequency oscillating signal generator cyclically coupled to individual conductive lines of the first set;
 a synchronous detection circuit operatively coupled with the generator and with individual conductive lines of the second set to identify user selected individual cross-points of the first and second sets of lines of the array; and
 a transistor coupling between each conductive line of the second set and the synchronous detection circuit, each individual conductive line of the second set being coupled with a base of the transistor coupled with the synchronous detection circuit.

2. An electronic user input device having a platform with a first, generally planar, user contact surface overlying a first, generally planar sensor, the first sensor being formed by separate and separated first and second sets of generally parallel, individual conductive lines transversely crossing over each other beneath the user contact surface of the platform, each pair of crossing lines defining a cross-point, the device characterized by:
 a radio frequency oscillating signal generator cyclically coupled to individual conductive lines of the first set;
 a synchronous detection circuit operatively coupled with the generator and with individual conductive lines of the second set to identify user selected individual cross-points of the first and second sets of lines of the array; and
 a grounded electrically conductive plane spaced away from the two sets of conductive lines on a side of the array opposite the platform and at a distance effective to reduce an active user activation area around each cross-point of the array within which user selection is sensed by the synchronous detection circuit sufficiently to prevent overlap of adjoining user activation areas of any pair of adjoining cross-points.

3. An electronic user input device having a platform with a first, generally planar, user contact surface overlying a first, generally planar sensor, the first sensor being formed by separate and separated first and second sets of generally parallel, individual conductive lines transversely crossing over each other beneath the user contact surface of the platform, each pair of crossing lines defining a cross-point, the device characterized by:
 a radio frequency oscillating signal generator cyclically coupled to individual conductive lines of the first set;
 a synchronous detection circuit operatively coupled with the generator and with individual conductive lines of the second set to identify user selected individual cross-points of the first and second sets of lines of the array; and
 a grounded conductive line between each adjoining pair of conductive lines of the first set so as to reduce cross coupling between the adjoining pair of conductive lines of the first set.

4. The device according to claim 1, 2, or 3, wherein the generator is a square wave generator.

5. The device according to claim 1, 2, or 3, further comprising a control circuit operatively coupled with the synchronous detection circuit and configured to identify cross-points of the array being potentially selected by the user and to identify one of the potentially selected cross-points as the selection for response of the device to user selection.

6. The device according to claim 1, 2, or 3, further comprising indicia permanently and visibly incorporated into an upper surface of the platform over the array in alignment over particular cross-points of the array for user identification of selected indicia through the array.

7. The device according to claim 1, 2, or 3, in combination with a printed sheet product configured for a predetermined orientation on the platform, the printed sheet product including printed indicia located in the predetermined orientation in alignment over particular cross-points of the array for user identification of selected indicia through the array.

* * * * *